(12) United States Patent
Grabkowitz et al.

(10) Patent No.: US 8,736,878 B2
(45) Date of Patent: May 27, 2014

(54) SYSTEM AND METHOD FOR OBTAINING AN ELECTRONIC DOCUMENT

(75) Inventors: Benjamin Gregory Grabkowitz, Holbrook, NY (US); Nicholas Joseph Candreva, Malverne, NY (US)

(73) Assignee: Canon U.S.A., Inc., Melville, NY (US)

( * ) Notice: Subject to any disclaimer, the term of this patent is extended or adjusted under 35 U.S.C. 154(b) by 87 days.

(21) Appl. No.: 13/304,190

(22) Filed: Nov. 23, 2011

(65) Prior Publication Data

US 2013/0128305 A1 May 23, 2013

(51) Int. Cl.
*G06F 3/12* (2006.01)

(52) U.S. Cl.
USPC ........................................... 358/1.15

(58) Field of Classification Search
USPC ........ 358/1.15, 1.13–1.18; 709/228; 382/274, 382/167
See application file for complete search history.

(56) References Cited

U.S. PATENT DOCUMENTS

| | | | |
|---|---|---|---|
| 5,796,827 A | 8/1998 | Coppersmith et al. | |
| 6,072,595 A | 6/2000 | Yoshiura et al. | |
| 7,082,316 B2 | 7/2006 | Eiden et al. | |
| 7,142,333 B2 * | 11/2006 | Struble | 358/402 |
| 7,181,024 B1 | 2/2007 | Oba et al. | |
| 7,419,100 B2 * | 9/2008 | Groeneboer et al. | 235/472.01 |
| 7,515,289 B2 | 4/2009 | Ohtuka | |
| 7,640,037 B2 | 12/2009 | Mutz et al. | |
| 7,822,411 B2 | 10/2010 | Nakatani | |
| 7,855,812 B2 | 12/2010 | Gelsomini et al. | |
| 7,882,557 B2 | 2/2011 | Coskun et al. | |
| 8,339,684 B2 * | 12/2012 | Kobako | 358/474 |
| 2001/0022624 A1 | 9/2001 | Tanaka et al. | |
| 2004/0192400 A1 | 9/2004 | Chwa | |
| 2004/0253923 A1 | 12/2004 | Braley et al. | |
| 2005/0274804 A1 | 12/2005 | Matsumoto | |
| 2006/0135064 A1 | 6/2006 | Cho et al. | |
| 2006/0139685 A1 | 6/2006 | Hayashi | |
| 2006/0217064 A1 | 9/2006 | Glass et al. | |

(Continued)

FOREIGN PATENT DOCUMENTS

| | | |
|---|---|---|
| DE | 102008045119 A1 | 3/2010 |
| JP | 2004334453 A | 11/2004 |

(Continued)

OTHER PUBLICATIONS

Near Field Communication on Printers, IP.com, Retrieved from URL: http://ip.com/IPCOM/000205138 on Nov. 2, 2011.

(Continued)

*Primary Examiner* — Vincent Rudolph
*Assistant Examiner* — Kevin Ky
(74) *Attorney, Agent, or Firm* — Canon U.S.A., Inc. IP Division

(57) ABSTRACT

Methods, devices, and computer-readable storage media are provided. Some embodiments of the invention include an image processing device displaying on a display of the image processing device a machine-readable code, wherein information encoded in the machine-readable code is usable by a mobile computing device to establish a communication session between the mobile computing device and the image processing device. In some embodiments, the mobile computing device reads the machine-readable code, obtains the information by decoding the machine-readable code, and establishes the communication session using the information. In some embodiments, during the communication session, the image processing device receives a scan command, scans a physical document in response to the scan command, and sends an electronic document representing the scanned physical document to the mobile computing device.

21 Claims, 8 Drawing Sheets

(56) References Cited

U.S. PATENT DOCUMENTS

| | | | |
|---|---|---|---|
| 2006/0267860 | A1 | 11/2006 | Rinaldo, Jr. et al. |
| 2007/0019215 | A1* | 1/2007 | Yu .................................. 358/1.3 |
| 2007/0019232 | A1 | 1/2007 | Kano |
| 2007/0288670 | A1 | 12/2007 | Lee |
| 2008/0081666 | A1 | 4/2008 | Masera et al. |
| 2008/0278437 | A1 | 11/2008 | Barrus et al. |
| 2009/0033972 | A1 | 2/2009 | Kato |
| 2009/0033984 | A1 | 2/2009 | Sahashi |
| 2009/0033985 | A1 | 2/2009 | Platov |
| 2009/0034731 | A1 | 2/2009 | Oshima |
| 2009/0036056 | A1 | 2/2009 | Oshima et al. |
| 2009/0052348 | A1 | 2/2009 | Kato et al. |
| 2009/0066998 | A1 | 3/2009 | Kato |
| 2009/0103124 | A1 | 4/2009 | Kimura et al. |
| 2009/0234731 | A1 | 9/2009 | Mariotti |
| 2009/0237741 | A1 | 9/2009 | Kurahashi |
| 2009/0265438 | A1 | 10/2009 | Podl |
| 2010/0012715 | A1 | 1/2010 | Williams et al. |
| 2010/0058359 | A1 | 3/2010 | Ferlitsch |
| 2010/0069008 | A1 | 3/2010 | Oshima et al. |
| 2010/0078472 | A1 | 4/2010 | Lin et al. |
| 2010/0080383 | A1 | 4/2010 | Vaughan et al. |
| 2010/0169790 | A1 | 7/2010 | Vaughan et al. |
| 2010/0172680 | A1 | 7/2010 | Butcher |
| 2010/0190446 | A1 | 7/2010 | Minami |
| 2010/0225957 | A1 | 9/2010 | Liu |
| 2011/0026069 | A1 | 2/2011 | Jesudason et al. |
| 2011/0085196 | A1 | 4/2011 | Liu et al. |
| 2011/0096354 | A1* | 4/2011 | Liu ................................ 358/1.15 |
| 2011/0108622 | A1 | 5/2011 | Das et al. |
| 2011/0116108 | A1 | 5/2011 | Ha et al. |
| 2011/0183612 | A1 | 7/2011 | Bregman-Amitai et al. |
| 2011/0194140 | A1 | 8/2011 | Sweet et al. |
| 2011/0194141 | A1 | 8/2011 | Sweet et al. |
| 2012/0324076 | A1* | 12/2012 | Zerr et al. ...................... 709/223 |
| 2013/0021643 | A1 | 1/2013 | Nuggehalli et al. |

FOREIGN PATENT DOCUMENTS

| | | | |
|---|---|---|---|
| JP | 2010055603 | A | 3/2010 |
| KR | 100663437 | B1 | 12/2006 |
| WO | 2007026938 | A1 | 3/2007 |

OTHER PUBLICATIONS

NFC:Near-Field Communications—A Look Into the (Near) Future of NFC, Retrieved from URL: http://www.scribd.com/doc/49415145/NFC-Near-Field-Communications-A-Look-Into-the-Near-Future-of-NFC on Nov. 3, 2011.

Brothatech, Samsung MobilePrint Adds Mobile Printing from Android and IOS Devices, Jan. 7, 2011, Retrieved from URL: http://www.marioarmstrong.com/2011/01/07/samsung-mobileprint-adds-mobile-printing-from-android-and-ios-devices on Nov. 3, 2011.

PageScope Mobile-Features, Retrieved from URL: http://www.konicaminolta.eu/business-solutions/products/applications/product-pages-applications/pagescope-mobile/features.html on Nov. 3, 2011.

Document Management, PageScope Mobile, Retrieved from URL: http://kmbs.konicaminolta.us/content/products/models/PageScope-Mobile.html on Nov. 3, 2011.

iTunes Preview, CAPTURE2GO by Kyocera Mita America, Inc., Retrieved from URL: http://itunes.apple.com/us/app/capture2go/id334277725?mt=8 on Nov. 3, 2011.

Scott Sloan, Lexmark Unveils Mobile Printing App, Retrieved from URL: http://www.kentucky.com/2011/07/12/1807954/lexmark-unveils-mobile-printing.html on Nov. 3, 2011.

Sriram et al., Redacton Powerpoint Presentation, Retrieved from URL: http://www.authorstream.com/Presentation/sri250691-332344-redacton-science-technology-ppt-powerpoint/ on Nov. 3, 2011.

Muscolino, The Mobile Business Printing Landscape:Assessing the Opportunity, May 2011, pp. 1-29 IDC # 228220, vol. 1.

Print Attachments from your Blackberry Smartphone or Laptop to the New Ricoh Hotspot Multifunction Printer, RICOH, 2010.

Xerox Mobile Print Solution, Workflow Solutions Brochure, Xerox, 2010.

Breezy, Easy Mobile Printing for Everyone, Mar. 21, 2011.

Concept of Mobile Printing Application, 2009, Canon Austria.

On the Road, Runway or Down the Hall—Print from your BlackBerry Smarthphone, RICOH, 2010.

Menon, "Touch Me to Transfer Data", Aug. 21, 2008, Retrieved from URL: http://thefutureofthings.com/news/1290/touch-me-to-transfer-data.html on Nov. 2, 2011.

Saxena et al.,"Secure Device Pairing based on a Visual Channel", IEEE Symposium on Jun. 2006, Retrieved from URL: http://docs.google.com/viewer?a=v&q=cache:zCzsUQ7AJzUJ:citeseerx.ist.psu.edu/viewdoc/download%3Fdoi%3D10.1.1.60.6885%26rep%3Drep1%26type%3Dpdf+device+pairing+barcode&hl=en&gl=us&pid=bl&srcid=ADGEESjAzq7vNdjxTi_BNSKMvYJE27A_j3cekXK0yDh9cHKqk_qSb-TICH-MPdliDt_nYCdfWqwqBTOqdZYIUs9m643SvYgdukaZ4dDRNJjqjKKLq-MJQBJraGDrCSidiEGbFWIB-I5d&sig=AHIEtbSUthadEnpiAngLsc8lwC2aiQV6Bw on Nov. 2, 2011.

\* cited by examiner

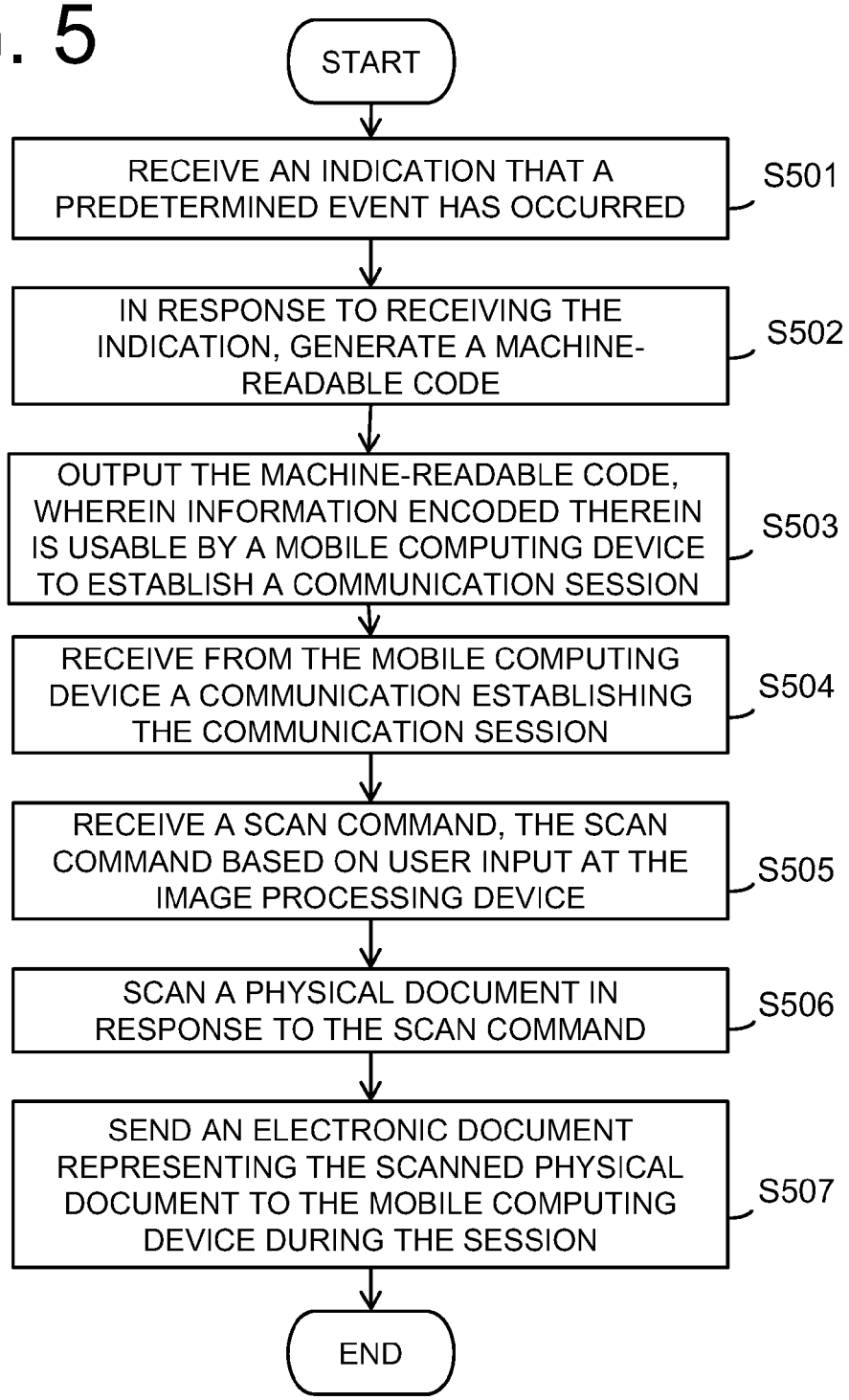

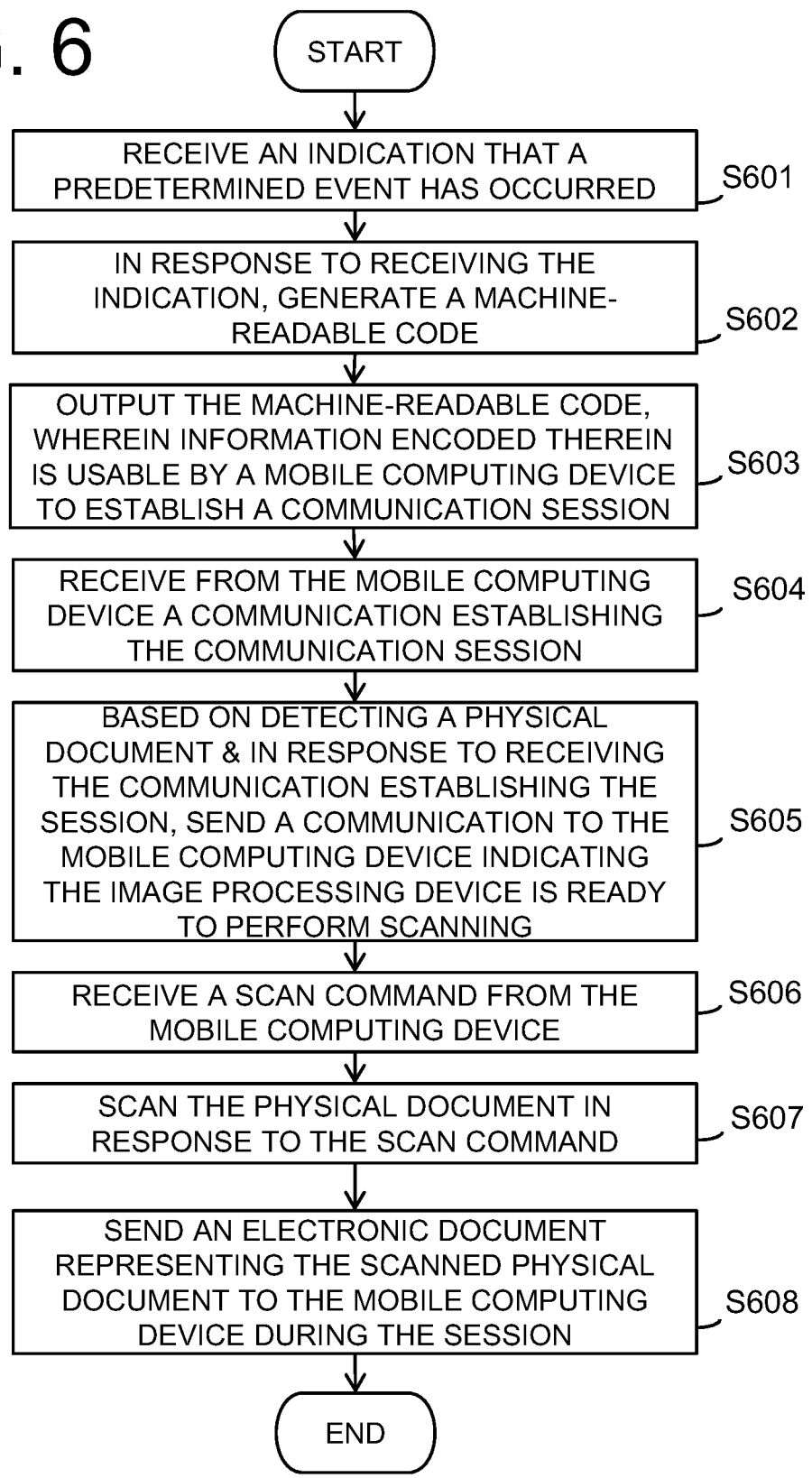

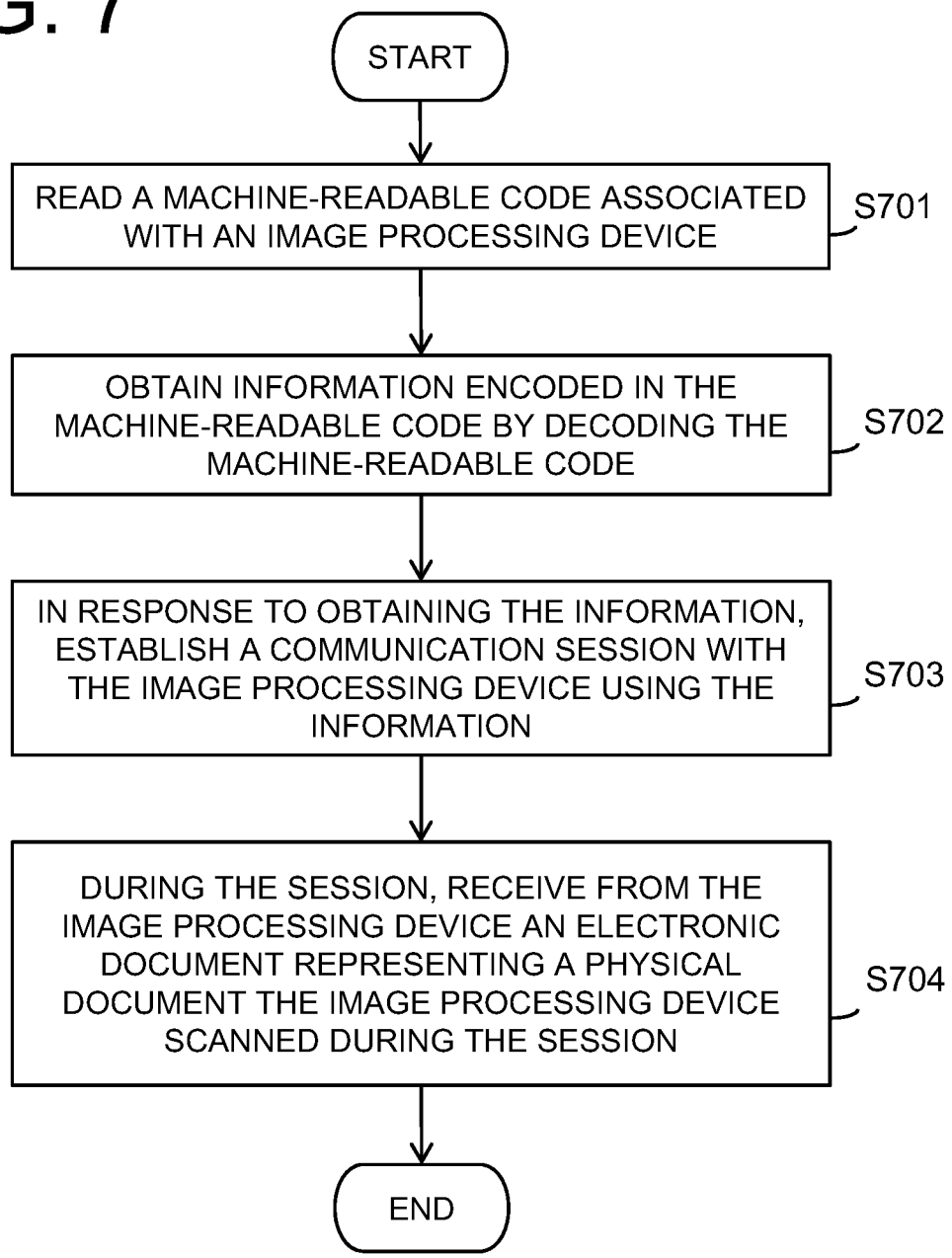

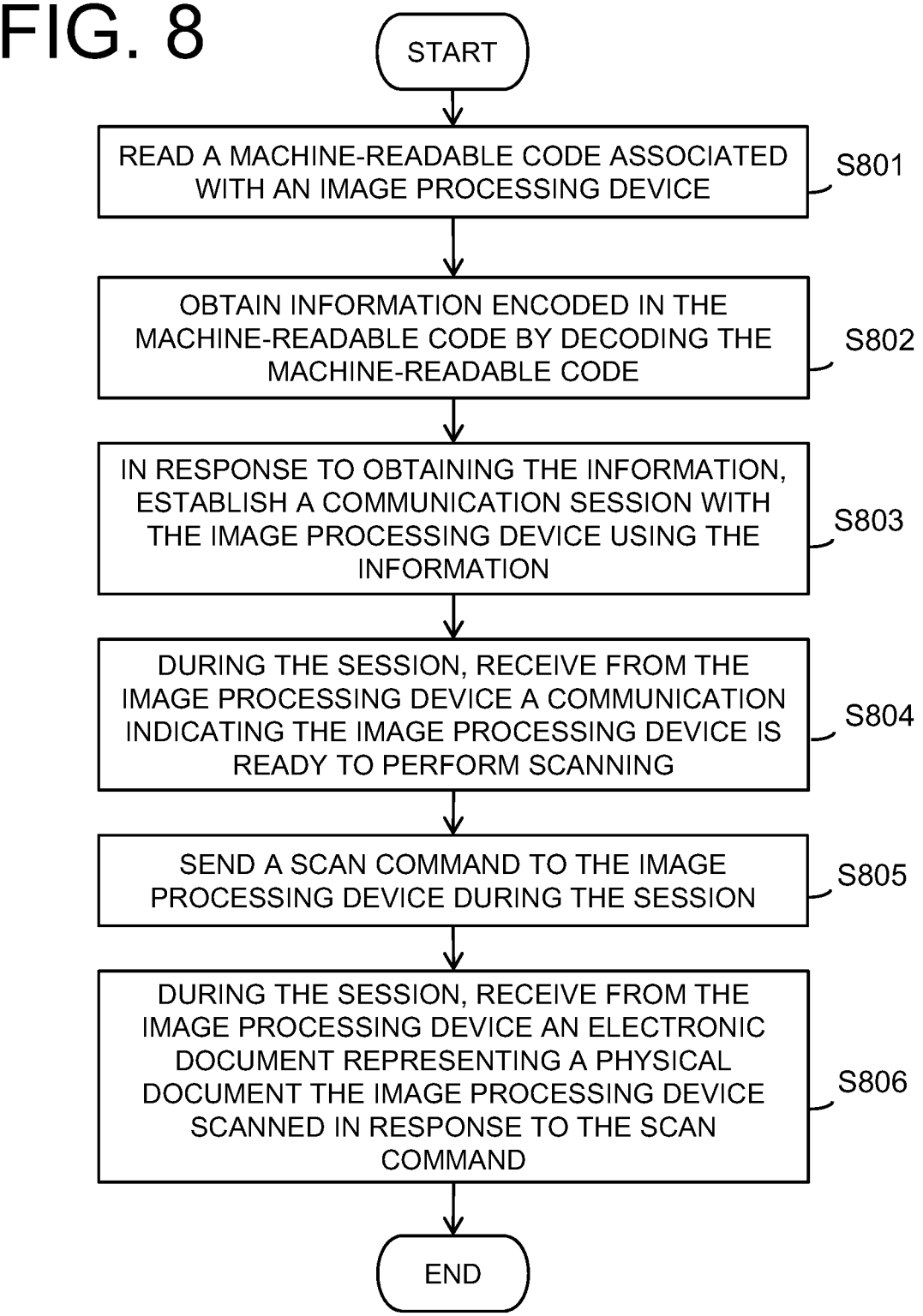

SYSTEM AND METHOD FOR OBTAINING AN ELECTRONIC DOCUMENT

BACKGROUND OF THE INVENTION

1. Field of the Invention

The present invention relates generally to document scanning and more particularly to a system and method for obtaining an electronic document at a mobile computing device.

2. Description of the Related Art

Image scanners are commonly used to optically scan physical documents. An electronic document representing the scanned physical document is generated and may be sent to a destination. For example, the electronic document may be sent to an email address as an attachment to an email or to a network location, such as a folder of a computer. In some instances, users may desire to obtain a document in electronic form on their mobile computing device. However, conventional methods for accomplishing this are unsatisfactory.

One conventional method of obtaining an electronic document at a mobile computing device is via email. A user may indicate an email address as the destination for an electronic document by, for example, manually inputting the email address or by selecting the email address from a list of destinations. Once the physical document is scanned, the electronic document representing the scanned physical document is sent to an email server. Using their mobile computing device, the user then accesses their email account in order to transfer the electronic document from the email server to their mobile computing device.

Another conventional method of obtaining an electronic document at a mobile computing device is via a network storage location. A user may indicate a folder of a computer as the destination for an electronic document. Once the physical document is scanned, the electronic document representing the scanned physical document is sent to the folder. The user must then access the folder and transfer the electronic document from the folder to their mobile computing device.

These conventional methods require a user to manually transfer an electronic document from a destination to a mobile computing device. Furthermore, the user must have information about the destination in order to send the electronic document to and/or access the electronic document at the destination. These steps and requirements can diminish the efficiency and ease with which a user obtains an electronic document at their mobile computing device.

SUMMARY OF THE INVENTION

Embodiments of the present invention address the various problems described above. Methods, apparatuses, and computer-readable storage media for obtaining an electronic document at a mobile computing device are disclosed.

Some embodiments of the invention are implemented by an image processing device, and include displaying on a display of the image processing device a machine-readable code, wherein information encoded in the machine-readable code is usable by a mobile computing device to establish a communication session between the mobile computing device and the image processing device. Moreover, a communication establishing the communication session is received from the mobile computing device, and a scan command is received during the communication session. In response to the scan command, a physical document is scanned. Furthermore, an electronic document representing the scanned physical document is sent to the mobile computing device during the communication session.

Some embodiments of the invention are implemented by a mobile computing device, and include reading a machine-readable code associated with an image processing device and obtaining information encoded in the machine-readable code by decoding the machine-readable code. In response to the obtaining the information, a communication session is established between the mobile computing device and the image processing device using the information. Furthermore, during the communication session, the mobile computing device receives from the image processing device an electronic document representing a physical document the image processing device scanned during the communication session.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates an example method for providing an electronic document.

FIG. 6 illustrates an example method for providing an electronic document.

FIG. 7 illustrates an example method for obtaining an electronic document.

FIG. 8 illustrates an example method for obtaining an electronic document.

DESCRIPTION OF THE EMBODIMENTS

Embodiments of the present invention are described with reference to the drawings.

Figure 1A:
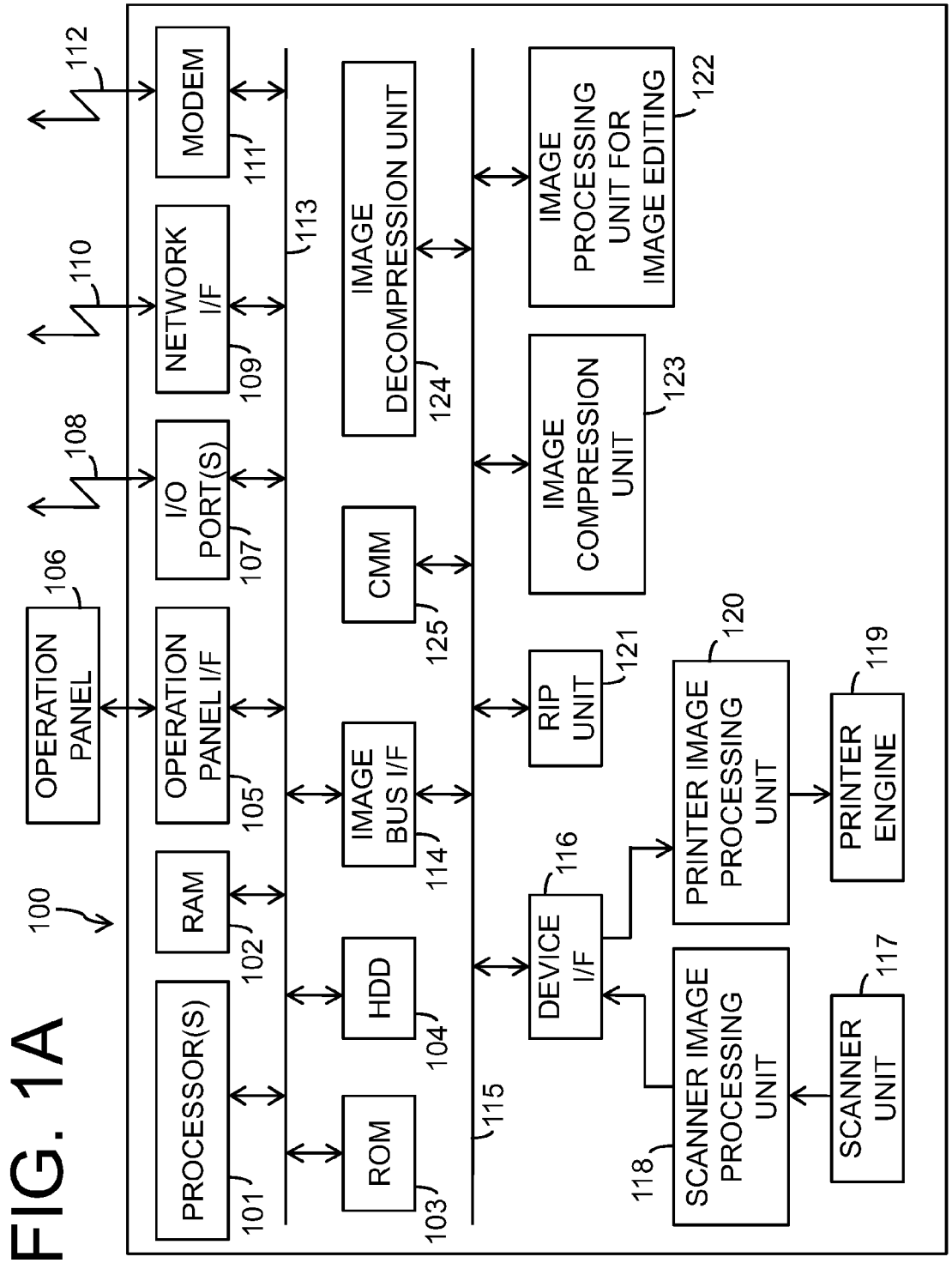
FIG. 1A illustrates an example image processing device.

FIG. 1A illustrates an example image processing device 100. The image processing device 100 of FIG. 1A is a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1A could be combined, deleted, or modified to form further implementations. Further by way of example, in some embodiments, other devices (for example, a stand-alone scanner, fax machine, or other device with scanning capabilities) and/or computing systems (for example, a computer connected to a scanner) may be implemented as the image processing device.

In some embodiments, the image processing device 100 performs one or more steps of one or more methods described or illustrated herein. In some embodiments, the image processing device 100 provides functionality described or illustrated herein. In some embodiments, software running on the image processing device 100 performs one or more steps of one or more methods described or illustrated herein or provides functionality described or illustrated herein. Particular embodiments include one or more portions of the image processing device 100.

The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices. For example, the CPU executes programs stored in a read only memory (ROM) 103 and in a hard disk drive (HDD) 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices.

The RAM 102 is used as a work area when the processor(s) 101 execute various instructions, such as those making up computer programs stored in the ROM 103 and/or the HDD 104. The RAM 102 may be used as a temporary storage area for various data, including input image data. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 103 may be flash memory.

The HDD 104 stores application data, program modules and other information. One or more program modules stored in the HDD 104 are configured to cause various operations and processes described herein to be executed. For example, in some embodiments, the HDD 104 stores instructions for outputting a machine-readable code, wherein information encoded in the machine-readable code is usable by a mobile computing device to establish a communication session between the mobile computing device and the image processing device 100, in accordance with embodiments described herein. In some embodiments, the HDD 104 stores instructions for processing digital image data, including but not limited to instructions for converting a format of a digital image data file, and/or instructions for executing an image processing technique such as optical character recognition (OCR).

The HDD 104 also stores other programs and data to be processed. For example, the HDD 104 stores an operating system including programs and data for managing hardware and software components of the image processing device 100. Applications on the image processing device 100 may utilize the operating system to perform various operations. The HDD 104 may further store other programs and/or drivers that enable various functions of the image processing device 100, graphical user interface (GUI) functions, and/or processor functions. The HDD 104 may also store data files including, for example, image data, user data, configuration information, GUI components, such as graphical elements or templates, or other data required by the image processing device 100.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 105 provides output signals to and receives input signals from an operation panel 106. Regarding the output signals, the operation panel interface 105 provides GUI data to the operation panel 106 for display on a liquid crystal display (LCD). Regarding the input signals, the operation panel interface 105 receives input signals based on user input operations at the operation panel 106 and relays the input signals to the processor(s) 101. The operation panel interface 105 and the operation panel 106 are described further with reference to FIG. 1B.

Figure 1B:
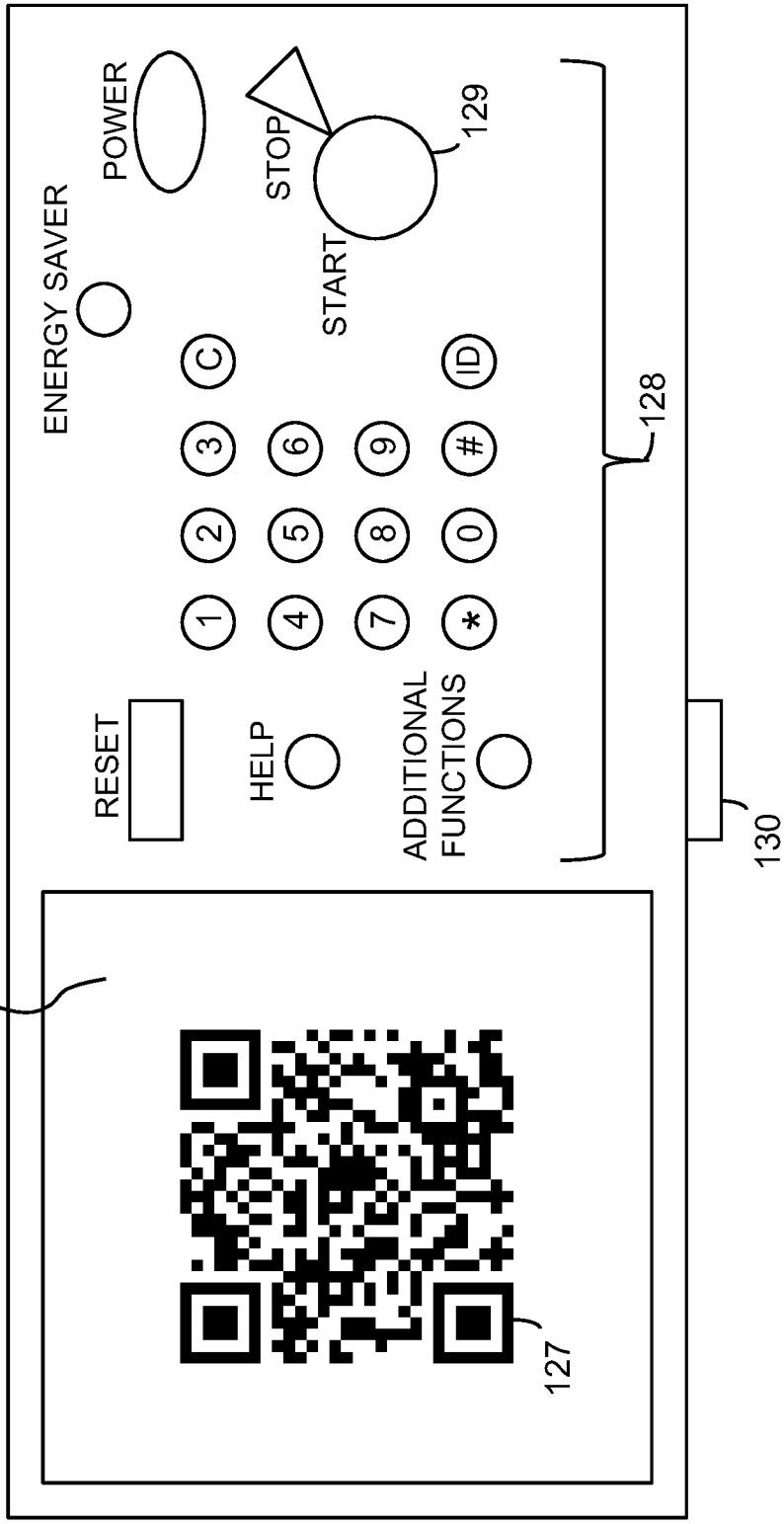
FIG. 1B illustrates an example implementation of an operation panel of the image processing device of FIG. 1A.

FIG. 1B illustrates an example implementation of the operation panel 106 of FIG. 1A. The operation panel 106 includes a display 126 and a hard key panel 128. The display 126 includes the LCD described above and a backlight which illuminates the LCD.

Regarding outputting signals to the display 126, the processor(s) 101 rasterize an image to be displayed on the display 126, and transfer the rasterized image to the display 126 via the operation panel interface 105. The display 126 then displays the image, such as a GUI. The processor(s) 101 are further operable to cause other types of images, such as images of scanned physical documents, to be displayed on the display 126. The processor(s) 101 may also turn on/off the backlight via the operation panel interface 105.

In FIG. 1B, the display 126 is shown displaying an example of a machine-readable code 127. In some embodiments of the invention, the processor(s) 101 execute instructions to cause the display 126 to display a machine-readable code. For example, the processor(s) 101 may cause the display 126 to display a two-dimensional barcode, such as a quick response (QR) code. The machine-readable code is discussed at greater length below in connection with other figures.

Regarding receiving input signals from the operation panel 106, in some embodiments, the display 126 further includes a touch sensitive element operable to receive user input operations or commands based on the touching of graphical objects displayed on the display 126. A user may touch the touch sensitive display 126 with a finger, stylus, or other tool to provide a user input operation. When the user touches a specific region on the touch sensitive display 126, the processor(s) 101 are notified via the operation panel interface 105 of the coordinates of the region. The processor(s) 101 determine the content of a user input operation based on the notified coordinates and the display contents on the display 126, and execute processing based on them.

User input operations may also be provided via the hard key panel 128. When the user presses a hard key of the hard key panel 128, the processor(s) 101 are notified via the operation panel interface 105 of information indicative of the user input operation. The processor(s) 101 execute processing based on the notification. While a particular hard key panel 128 is illustrated and described, other implementations may be utilized. For example, hard keys or buttons may be arranged differently. Further by way of example, input structures on the hard key panel 128 may exist in various forms including buttons, keys, switches, control pads, and so forth, depending on specific implementation requirements.

In the manner described above, a user can provide user input operations via the hard key panel 128 and/or the touch sensitive display 126 to control the image processing device 100 via the operation panel 106. For example, the user may press a start button 129 to manually initiate a scan command. Moreover, the image processing device 100 can output information to the user and issue requests (for example, a request for log-in credentials) by outputting images on the display 126.

A human body detection sensor 130 is attached to the operation panel 106, and is, for example, an infrared sensor. The sensor 130 may be attached to a portion of the image processing device 100 other than the operation panel 106. The human body detection sensor 130 detects the body of a user who manipulates the image processing device 100. For example, the human body detection sensor 130 notifies the processor(s) 101 via the operation panel interface 105 of an ON signal when an obstacle (commonly a human body) exists in front of the operation panel 106, and an OFF signal when it does not exist. Based on the notification, the processor(s) 101 determine whether a user is manipulating the operation panel 106.

Referring again to FIG. 1A, the image processing device 100 includes one or more input/output (I/O) port(s) 107. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107. Examples of external devices 108 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 109 includes hardware, software, or both providing one or more interfaces for communication (such as, for example, packet-based communication) between the image processing device 100 and one or more other computing systems or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A modem 111 modulates/demodulates image data and control signals. The modem 111 is connected to the Public Switched Telephone Network (PSTN) 112 and performs input/output of information between the image processing device 100 and the PSTN. By way of example, the modem may send/receive facsimile communications.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

An image bus interface 114 is an interface for connecting the system bus 113 and an image bus 115. The image bus interface 114 is a bus bridge which converts a data structure. The image bus 115 transfers image data at a high rate and interconnects the following components: a device interface 116, a raster image processor (RIP) unit 121, an image processing unit for image editing 122, an image compression unit 123, an image decompression unit 124, and a color management module (CMM) 125.

The device interface 116 is connected to the scanner unit 117 via the scanner image processing unit 118 and to the printer engine 119 via the printer image processing unit 120. The device interface 116 performs synchronous/asynchronous conversion of image data.

The scanner unit 117 includes a light source and an image sensor, such as a charge-coupled device (CCD), a complementary metal-oxide-semiconductor (CMOS), or a contact image sensor (CIS). The scanner unit 117 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 117 includes an optical system (for example, mirrors, lens) that directs the light to the image sensor. After the image sensor generates the electrical signals, an analog-to-digital converter converts the electrical signals to digital image data representing the scanned physical document. The scanner unit 117 then sends the digital image data to the scanner image processing unit 118.

In some embodiments, the scanner unit 117 includes one or more sensors to detect that a physical document is in position for the scanner unit 117 to execute a scanning operation on the physical document. The one or more sensors may include one or more optical sensors and/or one or more mechanical sensors. In some embodiments, a sensor detects a physical document by virtue of a light measurement the sensor obtains while the physical document is on the glass platen. In some embodiments, a sensor detects a physical document by virtue of a light measurement the sensor obtains while the physical document is in the ADF. In some embodiments, a sensor detects a physical document by detecting movement of a component (for example, a lever) due to contact with the physical document. Various other methods may also be employed for detecting a physical document. The one or more sensors may be coupled to the processor(s) 101 and send output signals to the processor(s) 101.

The scanner image processing unit 118 executes processing to remove distortion or otherwise correct for errors resulting from the scanning process. For example, the scanner image processing unit 118 may perform correction, editing and/or other operations on the digital image data representing the scanned physical document. The scanner image processing unit 118 then outputs the digital image data to one or more other components of the image processing device 100 via the device interface 116.

The printer engine 119 is an image output device for printing on a sheet an image corresponding to image data. The printer image processing unit 120 performs, on image data to be print-output, image processing correction corresponding to the printer engine 119.

The RIP unit 121 rasterizes page description language (PDL) code to image data. The image processing unit for image editing 122 performs various image processing of image data, such as rotation, magnification, coloring, trimming/masking, binary conversion, multivalued conversion, and blank determination. The image compression unit 123 performs coding of image data by a predetermined compression method when the image data is stored in the HDD 104. Image data compressed in the HDD 104 may be processed by the image processing unit for image editing 122 according to necessity or image-processed by the printer image processing unit 120 and then output by the printer engine 119. In such a case, the image decompression unit 124 decodes and decompresses the data which has been compressed and coded by the image compression unit 123.

The CMM 125 is a module for performing color conversion processing, also called color space conversion processing, on image data based on a profile or calibration data. The profile is information like a function for converting color image data displayed by a color space depending on an apparatus to a color space not depending on an apparatus (for example, Lab color space). The calibration data is used to correct a color reproduction characteristic of the scanner unit 117 or the printer engine 119.

Figure 2:
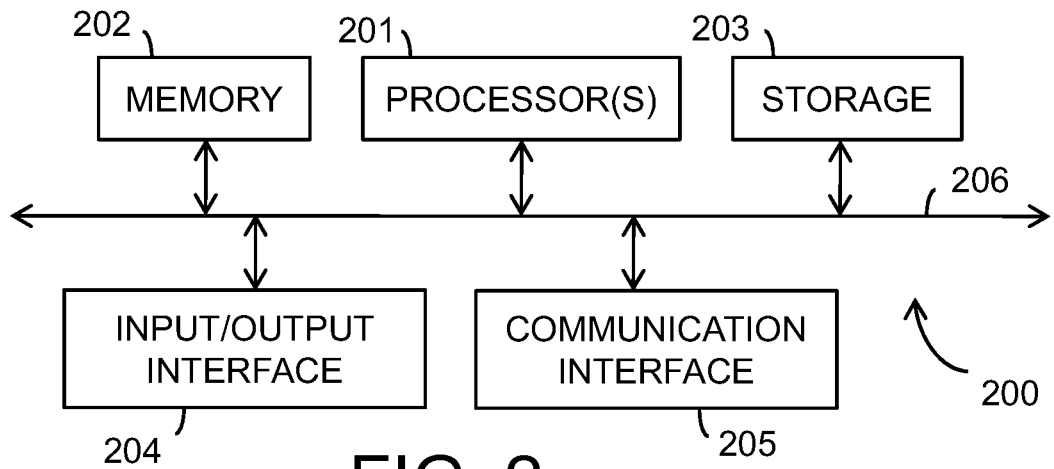
FIG. 2 illustrates an example mobile computing device.

FIG. 2 illustrates an example mobile computing device 200. In some embodiments, the mobile computing device 200 performs one or more steps of one or more methods described or illustrated herein. In some embodiments, the mobile computing device 200 provides functionality described or illustrated herein. In some embodiments, software running on the mobile computing device 200 performs one or more steps of one or more methods described or illustrated herein or provides functionality described or illustrated herein. Some embodiments include one or more portions of the mobile computing device 200.

The mobile computing device 200 includes one or more processor(s) 201, memory 202, storage 203, an input/output (I/O) interface 204, a communication interface 205, and a bus 206. The mobile computing device 200 may take any suitable physical form. For example, and not by way of limitation, the mobile computing device 200 may be a personal digital assistant (PDA), a mobile telephone, a laptop or notebook computer system, or a tablet computer system.

The processor(s) 201 include hardware for executing instructions, such as those making up a computer program. The processor(s) 201 may retrieve the instructions from the memory 202, the storage 203, an internal register, or an internal cache. The processor(s) 201 then decode and execute the instructions. Then, the processor(s) 201 write one or more results to the memory 202, the storage 203, the internal register, or the internal cache. The processor(s) 201 may provide the processing capability to execute the operating system, programs, user and application interfaces, and any other functions of the mobile computing device 200.

The processor(s) 201 may include a central processing unit (CPU), one or more general-purpose microprocessor(s), application-specific microprocessor(s), and/or special purpose microprocessor(s), or some combination of such processing components. The processor(s) 201 may include one or more graphics processors, video processors, audio processors and/or related chip sets.

In some embodiments, the memory 202 includes main memory for storing instructions for the processor(s) 201 to execute or data for the processor(s) 201 to operate on. By way of example, the mobile computing device 200 may load instructions from the storage 203 or another source to the memory 202. During or after execution of the instructions, the processor(s) 201 may write one or more results (which may be intermediate or final results) to the memory 202. One or more memory buses (which may each include an address bus and a data bus) may couple the processor(s) 201 to the memory 202. One or more memory management units (MMUs) may reside between the processor(s) 201 and the memory 202 and facilitate accesses to the memory 202 requested by the processor(s) 201. The memory 202 may include one or more memories. The memory 202 may be random access memory (RAM).

The storage 203 stores data and/or instructions. As an example and not by way of limitation, the storage 203 may include a hard disk drive, a floppy disk drive, flash memory, an optical disc, a magneto-optical disc, magnetic tape, or a Universal Serial Bus (USB) drive or a combination of two or more of these. In some embodiments, the storage 203 is a removable medium. In some embodiments, the storage 203 is a fixed medium. In some embodiments, the storage 203 is internal to the mobile computing device 200. In some embodiments, the storage 203 is external to the mobile computing device 200. In some embodiments, the storage 203 is non-volatile, solid-state memory. In some embodiments, the storage 203 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 203 may include one or more memory devices.

One or more program modules stored in the storage 203 may be configured to cause various operations and processes described herein to be executed. For example, the storage 203 may store instructions for decoding a machine-readable code, establishing a communication session between the mobile computing device 200 and an image processing device, sending a scan command to an image processing device, or a combination of these, in accordance with embodiments described herein.

The I/O interface 204 includes hardware, software, or both providing one or more interfaces for communication between the mobile computing device 200 and one or more I/O devices. The mobile computing device 200 may include one or more of these I/O devices, where appropriate. One or more of these I/O devices may enable communication between a person and the mobile computing device 200. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 204 includes one or more device or software drivers enabling the processor(s) 201 to drive one or more of these I/O devices. The I/O interface 204 may include one or more I/O interfaces.

The communication interface 205 includes hardware, software, or both providing one or more interfaces for communication (such as, for example, packet-based communication)

between the mobile computing device 200 and one or more other computing systems or one or more networks. As an example and not by way of limitation, the communication interface 205 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 205 for it. As an example and not by way of limitation, the mobile computing device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 200 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The mobile computing device 200 may include any suitable communication interface 205 for any of these networks, where appropriate. The communication interface 205 may include one or more communication interfaces 205.

The communication interface 205 may further include a near field communication (NFC) device, providing close range communication capabilities. The NFC device may include an antenna that allows for close range communication at relatively low data rates (for example, 424 kb/s). In some embodiments, the NFC device may also allow for close range communication at relatively high data rates (for example, 560 Mbps). In some embodiments, communication using an NFC device may occur within a range of approximately 2 to 4 cm, or, in some embodiments, the communication distance may be up to about 10 cm. As will be appreciated by those skilled in the art, close range communication using an NFC device may take place via magnetic field induction, thus allowing the NFC device to communicate with other NFC-enabled devices or to retrieve information from tags having radio frequency identification (RFID) circuitry. Additionally, magnetic field induction may also allow an NFC device to induce another NFC-enabled device that is in a passive or sleep mode into an active mode. The NFC device may exist as a stand-alone component or may be integrated into another chipset. An NFC device may operate using one or more protocols, such as the Near Field Communication Interface and Protocols (NFCIP-1), for communicating with another NFC-enabled device. The protocols may be used to adapt the communication speed and to designate one of the connected devices as an initiating device that controls and/or initiates the NFC connection.

The bus 206 interconnects various components of the mobile computing device 200 thereby enabling the transmission of data and execution of various processes. The bus 206 may include one or more types of bus structures including a memory bus or memory controller, a peripheral bus, and a local bus using any of a variety of bus architectures.

Figures 3A, 3B:
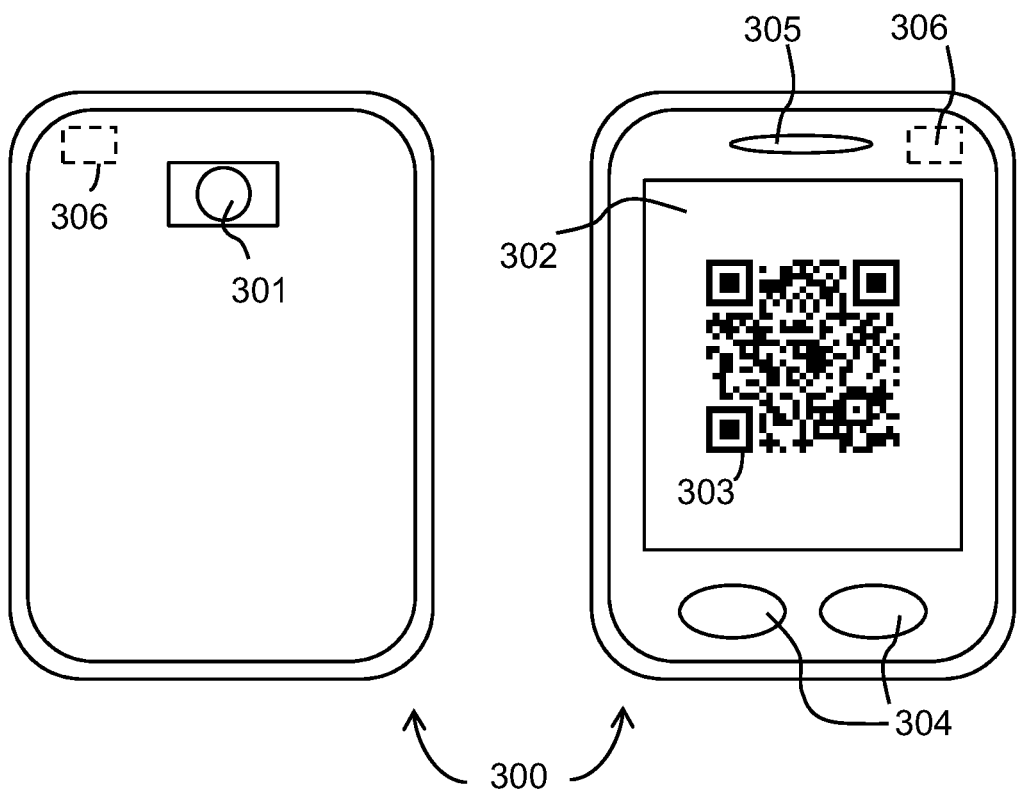
FIGS. 3A and 3B illustrate an example mobile computing device.

FIGS. 3A and 3B illustrate an example mobile computing device 300. The example mobile computing device 300 is one concrete example of the mobile computing device 200 described above with respect to FIG. 2.

FIG. 3A shows a rear view of the example mobile computing device 300 and FIG. 3B shows a front view of the example mobile computing device 300. The mobile computing device 300 includes a reading unit 301 (including a camera), a display 302, hard keys 304, a speaker 305, and an NFC device 306 located within the enclosure of the mobile computing device 300. Although FIGS. 3A and 3B show a particular configuration of features of the mobile computing device 300, one or more of the features could be differently arranged. For example, the reading unit 301 may be disposed on the front of the mobile computing device 300 and/or could be disposed in a different location on the front or back of the mobile computing device 300. Other components, such as the speaker 305 or hard keys 304, could also be differently arranged. Furthermore, the mobile computing device 300 may include more or less features than illustrated. For example, the mobile computing device 300 may include multiple reading units, and/or more or less hard keys 304 than shown.

The reading unit 301 is an I/O device of the mobile computing device 300. The reading unit 301 includes a camera for acquiring an image and may additionally include image processing circuitry for processing an acquired image. In some embodiments, the reading unit 301 acquires digital still or moving images, such as digital photographs or movies. In some embodiments, the reading unit 301 may be utilized in conjunction with application software in order to acquire an image of a machine-readable code (for example, a two-dimensional barcode) and decode the machine-readable code in order for the mobile computing device 300 to obtain information encoded in the machine-readable code.

The display 302 is an I/O device of the mobile computing device 300. In some embodiments, the display 302 includes a liquid crystal display (LCD) and backlight which allow for output operations such as presenting information in a graphical user interface (GUI). In some embodiments, the display 302 includes a touch sensitive element operable to receive user input operations or commands based on the touching of graphical objects displayed on the display 302.

In some embodiments, the display 302 may display an image based on image data acquired by the reading unit 301. For example, the reading unit 301 may be used to capture the machine-readable code 127 image displayed on the display 126 of the image processing device 100 in FIG. 1B. When the reading unit 301 acquires the image data, the display 302 may be configured to output the digital image data as a machine-readable code image 303 on the display 302.

The hard keys 304 are I/O devices of the mobile computing device 300. A user may provide user input operations by pressing one of the hard keys 304. Other user interface implementations may also be utilized. For example, hard keys or buttons may be arranged differently. Further by way of example, input structures on the mobile computing device 300 may exist in various forms including buttons, keys, control pads, and so forth, depending on specific implementation requirements.

The speaker 305 is an I/O device for transmitting audio signals, such as voice data received during a telephone call.

The NFC device 306 is a communication interface located within the enclosure of the mobile computing device 300. The NFC device 306 may be used to facilitate near-field wireless communication and data transfer between the mobile computing device 300 and another NFC-enabled device.

The mobile computing device 300 may further include one or more suitable communication interfaces for communicating with other computing devices and/or networks. As an example and not by way of limitation, the mobile computing device 300 may be configured to communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these.

Figure 4B:
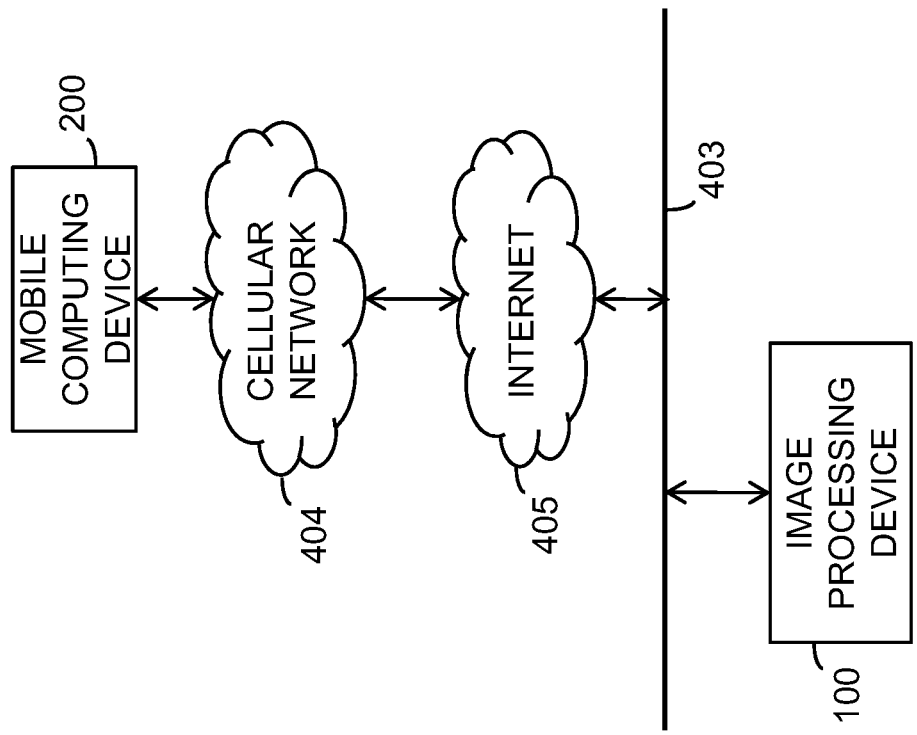
FIGS. 4A and 4B illustrate example network environments.
Figure 4A:
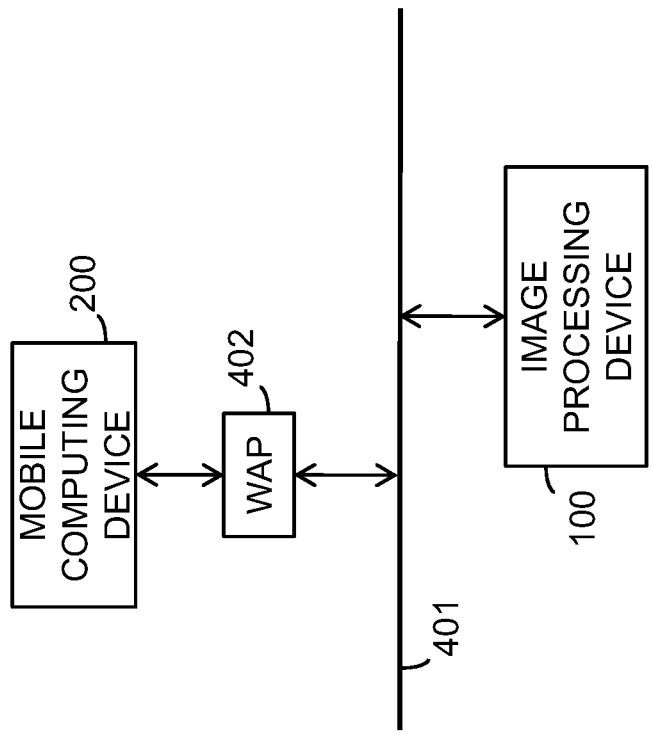

FIGS. 4A and 4B illustrate example network environments. FIG. 4A depicts the image processing device 100, the mobile computing device 200, a network 401, and a wireless access point (WAP) 402. The image processing device 100 is connected to the network 401. By way of example, the network 401 may comprise a local area network (LAN), an intranet, a wide area network (WAN), or combinations thereof. The WAP 402 may be a WI-FI access point and the mobile computing device 200 may be WI-FI enabled. The mobile computing device 200 accesses the network 401 via the WAP 402. Accordingly, the image processing device 100 and the mobile computing device 200 are both connected to the network 401.

FIG. 4B depicts the image processing device 100, the mobile computing device 200, a network 403, a cellular network 404, and the Internet 405. The image processing device 100 is connected to the network 403. By way of example, the network 403 may comprise a local area network (LAN), an intranet, a wide area network (WAN), or combinations thereof. By way of example, FIG. 4B may represent a virtual private network (VPN) in which the network 403 comprises an intranet of an organization, such as a company. A user of the mobile computing device 200 may use a cellular service to access the VPN and thereby gain access to an intranet resource, such as the image processing device 100. The mobile computing device 200 uses the cellular service to connect to the cellular network 404. The cellular service allows the mobile computing device 200 to access the Internet 405 through which the mobile computing device 200 accesses the intranet, which may comprise a LAN. In this manner, the image processing device 100 and the mobile computing device 200 are both connected to the network 403.

The example network environments of FIGS. 4A and 4B represent environments in which embodiments of the invention may be implemented. However, it will be understood that embodiments of the invention may also be implemented in various other suitable network environments. In some embodiments, the user may be standing at the image processing device 100 with the mobile computing device 200 in a network environment shown at FIG. 4A or at FIG. 4B.

For example, a user may be standing at the image processing device 100 of FIG. 4A, wherein the user has a mobile computing device 200 connected to the network 401 via the WAP 402, and the image processing device 100 is also connected to the network 401. Further by way of example, a user may be standing at the image processing device 100 of FIG. 4B, wherein the user has a mobile computing device 200 connected to the network 403 via the cellular network 404 and the Internet 405, and the image processing device 100 is also connected to the network 403. A user having the mobile computing device 200 and standing at the image processing device 100 may desire to obtain a physical document in electronic form on the mobile computing device 200.

FIG. 5 illustrates an example method for providing an electronic document. In step S501, the image processing device 100 receives an indication that a predetermined event has occurred. The predetermined event is an event in response to which the image processing device 100 generates a machine-readable code, according to embodiments of the invention. In some embodiments, in response to the predetermined event, the image processing device 100 also displays on the display 126 a request related to the machine-readable code. For example, the image processing device 100 may prompt a user of a mobile computing device 200 to use the mobile computing device 200 to scan the machine-readable code.

In some embodiments, the predetermined event comprises a physical document being set in position for the image processing device 100 to perform a scan of the physical document. For example, the image processing device 100 may receive the indication from the one or more sensors described with respect to FIG. 1A, which detect that a physical document is in position for the scanner unit 117 to execute a scanning operation on the physical document. A user may place the physical document on the glass platen or the ADF. When the one or more sensors detect the physical document has been placed on the glass platen or ADF, the one or more sensors send a signal to the processor(s) 101 indicating the presence of the physical document.

In some embodiments, the predetermined event comprises a user providing a user input operation at the operation panel 106. For example, a user standing at the image processing device 100 may press a graphical object displayed on the display 126 or press a hard key on the hard key panel 128.

In some embodiments, the predetermined event comprises a start-up operation in response to the image processing device 100 being turned on. That is, in some embodiments, the machine-readable code is generated and output as a default upon starting the image processing device 100.

In some embodiments, the predetermined event comprises a user being detected at the image processing device 100 by the human body detection sensor 130. When a user is at the image processing device 100, the human body detection sensor 130 notifies the processor(s) 101 via the operation panel interface 105 of an ON signal. Based on the notification, the processor(s) 101 may determine to generate a machine-readable code.

In some embodiments, the predetermined event comprises a card reader or NFC reader of the image processing device 100 receiving a signal from a smart card or NFC device.

In some embodiments, the predetermined event may comprise a combination of two or more of the above-described events, or another event. In the various embodiments described above, the image processing device 100 may receive the indication that a predetermined event has occurred from a user operation of a user standing at the image processing device 100. In some embodiments, the user may be standing at the image processing device 100 with the mobile computing device 200 in a network environment shown at FIG. 4A or at FIG. 4B.

In step S502, the image processing device 100 generates a machine-readable code in response to receiving the indication that the predetermined event has occurred.

In some embodiments, the instructions for generating the machine-readable code are stored on one or more memory devices of the image processing device 100. For example, the instructions may be included in an application program stored on the HDD 104. In some embodiments, the machine-readable code is generated remotely and sent to the image processing device 100.

According to some embodiments, in response to receiving the indication that the predetermined event has occurred, the processor(s) 101 retrieve the instructions and generate the machine-readable code. For example, the processor(s) 101 may retrieve the instructions from an application program stored on the HDD 104 and generate the machine-readable code according to the instructions retrieved. In some embodiments, the instructions are for displaying a two-dimensional barcode, such as a QR code. For example, the instructions may cause the processor(s) 101 to generate a machine-readable code such as the machine-readable code 127 displayed on the display 126 of FIG. 1B.

In some embodiments, the processor(s) 101 generate the machine-readable code using a randomly generated password to encrypt data. A machine-readable code may be generated using a different password each time a machine-readable code is generated. For example, for each instance the image processing device 100 receives the indication that a predetermined event has occurred (step S501), the processors(s) 101 may generate a unique machine-readable code according to a unique password used for encryption.

Information encoded in the machine-readable code may vary. In some embodiments, identification information that identifies the image processing device 100 is encoded in the machine-readable code. In some cases, the mobile computing device 200 may be able to connect to the same network as the image processing device 100, but may not have identifying information (such as Internet Protocol (IP) address) of the image processing device 100. For example, FIG. 4A may represent a public network environment, in which the image processing device 100 is available at a hotel, library, or business establishment (for example, a restaurant or coffee shop). The user of the mobile computing device 200 may be able to access the network 401 via a WI-FI WAP 402 provided by the hotel, library or business establishment, but may not know identifying information of the image processing device 100. Or the identifying information may be available but it may be difficult to locate or inconvenient to input into the mobile computing device 200. By the image processing device 100 encoding the identification information in the machine-readable code, and then outputting the machine-readable code (as discussed in step S503), the mobile computing device 200 may easily identify the network 401 resource, namely, the image processing device 100, by reading and decoding the machine-readable code to obtain the identification information.

Further by way of example, FIG. 4B may represent a VPN as described above. Many network resources may exist on the network 403 and the mobile computing device 200 may not be configured for some network resources, such as the image processing device 100. By the image processing device 100 encoding the identification information in the machine-readable code, and then outputting the machine-readable code (as discussed in step S503), the mobile computing device 200 may easily identify the network 403 resource, namely, the image processing device 100, by reading and decoding the machine-readable code to obtain the identification information.

In some embodiments, other configuration information usable by the mobile computing device 200 for establishing the communication session may be encoded in the machine-readable code, such as other information relating to the image processing device 100, or routing information.

In step S503, the image processing device 100 outputs the machine-readable code generated in step S502. At least a portion of the information encoded in the machine-readable code is usable by the mobile computing device 200 to establish a communication session between the mobile computing device 200 and the image processing device 100. By way of example, the processor(s) 101 of the image processing device 100 may cause the display 126 to display a machine-readable code such as the machine-readable code 127, in the manner described above with respect to FIG. 1B. Using the information encoded in the machine-readable code, the mobile computing device 200 is able to establish the communication session. For example, in some embodiments, the mobile computing device 200 reads the machine-readable code, decodes the machine-readable code to obtain identification information identifying the image processing device 100, and then establishes the communication session using the identification information.

In step S504, the image processing device 100 receives from the mobile computing device 200 a communication establishing the communication session. For example, the mobile computing device 200 may initiate a handshake in order to establish a communication session with the image processing device 100. Based on an initial handshake request from the mobile computing device 200, the image processing device 100 may send an acknowledgment. Based on the handshake, a communication session may be established between the mobile computing device 200 and the image processing device 100. In some embodiments, the image processing device 100 uses the network interface 109 when receiving and sending signals.

Prior to the communication session being established, the mobile computing device 200 and the image processing device 100 may already be connected to the same network. For example, the mobile computing device 200 and the image processing device 100 may both be connected to the network 401 of FIG. 4A, or the mobile computing device 200 and the image processing device 100 may both be connected to the network 403 of FIG. 4B. Thus, the communication session established in step S504 may be a communication session over a network to which the mobile computing device 200 and the image processing device 100 were already connected at the time the communication session was established.

In step S505, the image processing device 100 receives a scan command, wherein the scan command is based on a user input operation via the operation panel 106 of the image processing device 100. In some embodiments, the user input operation is a user input operation via the hard key panel 128 of the image processing device 100. For example, the user may press the start button 129 to manually initiate the scan command. In some embodiments, the user input operation is a user input operation via the touch sensitive display 126 of the image processing device 100. For example, the user may touch a graphical object displayed on the display 126 to manually initiate the scan command.

The image processing device 100 receives the scan command during the communication session between the mobile computing device 200 and the image processing device 100. The scan command comprises an instruction to perform an image scanning operation on a physical document placed on the glass platen or in the ADF of the scanner unit 117.

In some embodiments, in addition to the instruction to perform the scanning operation, the scan command may further include information pertaining to the scanning operation. For example, the scan command may include scan settings pertaining to a resolution of the scan, color or black and white settings, contrast settings, file type settings for the electronic document resulting from the scan operation, or other scan settings for the scanning operation. The scan settings included in the scan command may be preset or default settings stored in the image processing device 100. In some embodiments, the scan settings included in the scan command may be custom settings set in the image processing device 100 prior to receiving the scan command.

In some embodiments, the scan command may further include destination information. For example, the scan command may include identification information of the mobile computing device 200 (for example, a device identification (ID) of the mobile computing device 200). In some embodiments, the scan command does not include destination information. For example, the image processing device 100 may already have destination information stored (for example, in a cache memory of the image processing device 100) such that destination information does not need to be included in the scan command. By way of example, the identification information of the mobile computing device 200 may be stored with other session information in the image processing device 100 and may be used as the destination information for sending a scan result.

In step S506, the image processing device 100 scans a physical document in response to the scan command received in step S505. The physical document is, for example, a physical document placed on the glass platen or in the ADF of the scanner unit 117. In response to the scan command, the scanner unit 117 performs a scanning operation on the physical document. The image sensor scans the physical document to generate electrical signals which are converted to digital image data representing the scanned physical document. In some embodiments, the digital image data undergoes image processing using one or more of the components of the image processing device 100 described above to processes the digital image data. Digital image data is then sent to the processor(s) 101. In some embodiments, the digital image data is also stored in memory, such as the HDD 104 of the image processing device 100.

The processor(s) 101 then convert the digital image data into an electronic document representing the scanned physical document and the electronic document is ready to be sent to a destination. In converting the digital image data into the electronic document, the processor(s) 101 may perform format conversion processing. For example, the processor(s) 100 may convert the digital image data to an electronic document in a particular file format, such as portable document format (PDF), plain text, or some other file format for sending. In some embodiments, the processor(s) 101 may also execute an image processing technique such as optical character recognition (OCR) on the electronic document.

Instructions for performing file format conversion or for performing various image processing techniques may be stored in the HDD 104 or another storage medium of the image processing device 100 and may be executed by the processor(s) 101. In some embodiments, commands for performing these or other image processing techniques may be in the scan command. For example, the scan command may indicate a format into which the digital image data should be converted for sending the electronic document representing the scanned physical document to a destination.

In some embodiments, an image of the scanned physical document may be displayed on the display 126 of the image processing device 100. The image may be displayed automatically according to a default setting, or the image may be displayed in response to a user input requesting the image be displayed. In some embodiments, the processor(s) 101 cause the display 126 to display a query asking the user whether the user would like the image to be displayed.

In step S507, the image processing device 100 sends the electronic document representing the scanned physical document to the mobile computing device 200 during the communication session. In some embodiments, the image processing device 100 automatically initiates sending the electronic document to the mobile computing device 200 upon completing the processing of step S506. In some embodiments, the image processing device 100 sends the electronic document to the mobile computing device 200 in response to a request from the mobile computing device 200 for the electronic document. For example, upon completing the processing of step S506, the image processing device 100 may store the electronic document and send to the mobile computing device 200 a communication indicating the scanning of the physical document is complete. Based on the communication indicating the scanning of the physical document is complete, the mobile computing device 200 may send to the image processing device 100 the request for the electronic document. In response to the request, the image processing device 100 retrieves the electronic document (for example, from the HDD 104) and sends the electronic document to the mobile computing device 200, according to embodiments of the invention.

In some embodiments, the image processing device 100 sends the electronic document to the mobile computing device 200 over the communication channel used for the communication session. For example, in some embodiments, the communication session is over the network 401 of FIG. 4A and the image processing device 100 sends the electronic document to the mobile computing device 200 over the network 401 and the WAP 402. In some embodiments, the communication session is over the network 403 of FIG. 4B and the image processing device 100 sends the electronic document to the mobile computing device 200 over the network 403, the Internet 405 and the cellular network 404. Alternatively, in some embodiments, the image processing device 100 sends the electronic document to the mobile computing device 200 over a different communication channel than the one used for the communication session.

In some embodiments, in addition to sending the electronic document to the mobile computing device 200, the image processing device 100 also displays on the display 126 a confirmation that the electronic document has been sent to the mobile computing device 200. In some embodiments, in addition to sending the electronic document to the mobile computing device 200, the image processing device 100 also sends to a destination a notification that the electronic document has been sent to the mobile computing device 200.

FIG. 6 illustrates an example method for providing an electronic document. In step S601, the image processing device 100 receives an indication that a predetermined event has occurred. The predetermined event is an event in response to which the image processing device 100 generates a machine-readable code, according to embodiments of the invention. In some embodiments, in response to the predetermined event, the image processing device 100 also displays on the display 126 a request related to the machine-readable code. For example, the image processing device 100 may prompt a user of a mobile computing device 200 to use the mobile computing device 200 to scan the machine-readable code.

In some embodiments, the predetermined event comprises a physical document being set in position for the image processing device 100 to perform a scan of the physical document. For example, the image processing device 100 may receive the indication from the one or more sensors described with respect to FIG. 1A, which detect that a physical document is in position for the scanner unit 117 to execute a scanning operation on the physical document. A user may place the physical document on the glass platen or the ADF. When the one or more sensors detect the physical document has been placed on the glass platen or ADF, the one or more sensors send a signal to the processor(s) 101 indicating the presence of the physical document.

In some embodiments, the predetermined event comprises a user providing a user input operation at the operation panel 106. For example, a user standing at the image processing device 100 may press a graphical object displayed on the display 126 or press a hard key on the hard key panel 128.

In some embodiments, the predetermined event comprises a start-up operation in response to the image processing device 100 being turned on. That is, in some embodiments, the machine-readable code is generated and output as a default upon starting the image processing device 100.

In some embodiments, the predetermined event comprises a user being detected at the image processing device 100 by the human body detection sensor 130. When a user is at the image processing device 100, the human body detection sensor 130 notifies the processor(s) 101 via the operation panel interface 105 of an ON signal. Based on the notification, the processor(s) 101 may determine to generate a machine-readable code.

In some embodiments, the predetermined event comprises a card reader or NFC reader of the image processing device 100 receiving a signal from a smart card or NFC device.

In some embodiments, the predetermined event may comprise a combination of two or more of the above-described events, or another event. In the various embodiments described above, the image processing device 100 may receive the indication that a predetermined event has occurred from a user operation of a user standing at the image processing device 100. In some embodiments, the user may be standing at the image processing device 100 with the mobile computing device 200 in a network environment shown at FIG. 4A or at FIG. 4B.

In step S602, the image processing device 100 generates a machine-readable code in response to receiving the indication that the predetermined event has occurred.

In some embodiments, the instructions for generating the machine-readable code are stored on one or more memory devices of the image processing device 100. For example, the instructions may be included in an application program stored on the HDD 104. In some embodiments, the machine-readable code is generated remotely and sent to the image processing device 100.

According to some embodiments, in response to receiving the indication that the predetermined event has occurred, the processor(s) 101 retrieve the instructions and generate the machine-readable code. For example, the processor(s) 101 may retrieve the instructions from an application program stored on the HDD 104 and generate the machine-readable code according to the instructions retrieved. In some embodiments, the instructions are for displaying a two-dimensional barcode, such as a QR code. For example, the instructions may cause the processor(s) 101 to generate a machine-readable code such as the machine-readable code 127 displayed on the display 126 of FIG. 1B.

In some embodiments, the processor(s) 101 generate the machine-readable code using a randomly generated password to encrypt data. A machine-readable code may be generated using a different password each time a machine-readable code is generated. For example, for each instance the image processing device 100 receives the indication that a predetermined event has occurred (step S601), the processors(s) 101 may generate a unique machine-readable code according to a unique password used for encryption.

Information encoded in the machine-readable code may vary. In some embodiments, identification information that identifies the image processing device 100 is encoded in the machine-readable code. In some cases, the mobile computing device 200 may be able to connect to the same network as the image processing device 100, but may not have identifying information (such as IP address) of the image processing device 100. For example, FIG. 4A may represent a public network environment, in which the image processing device 100 is available at a hotel, library, or business establishment (for example, a restaurant or coffee shop). The user of the mobile computing device 200 may be able to access the network 401 via a WI-FI WAP 402 provided by the hotel, library or business establishment, but may not know identifying information of the image processing device 100. Or the identifying information may be available but it may be difficult to locate or inconvenient to input into the mobile computing device 200. By the image processing device 100 encoding the identification information in the machine-readable code, and then outputting the machine-readable code (as discussed in step S603), the mobile computing device 200 may easily identify the network 401 resource, namely, the image processing device 100, by reading and decoding the machine-readable code to obtain the identification information.

Further by way of example, FIG. 4B may represent a VPN as described above. Many network resources may exist on the network 403 and the mobile computing device 200 may not be configured for some network resources, such as the image processing device 100. By the image processing device 100 encoding the identification information in the machine-readable code, and then outputting the machine-readable code (as discussed in step S603), the mobile computing device 200 may easily identify the network 403 resource, namely, the image processing device 100, by reading and decoding the machine-readable code to obtain the identification information.

In some embodiments, other configuration information usable by the mobile computing device 200 for establishing the communication session may be encoded in the machine-readable code, such as other information relating to the image processing device 100, or routing information.

In step S603, the image processing device 100 outputs the machine-readable code generated in step S602. At least a portion of the information encoded in the machine-readable code is usable by the mobile computing device 200 to establish a communication session between the mobile computing device 200 and the image processing device 100. By way of example, the processor(s) 101 of the image processing device 100 may cause the display 126 to display a machine-readable code such as the machine-readable code 127, in the manner described above with respect to FIG. 1B. Using the information encoded in the machine-readable code, the mobile computing device 200 is able to establish the communication session. For example, in some embodiments, the mobile computing device 200 reads the machine-readable code, decodes the machine-readable code to obtain identification information identifying the image processing device 100, and then establishes the communication session using the identification information.

In step S604, the image processing device 100 receives from the mobile computing device 200 a communication establishing the communication session. For example, the mobile computing device 200 may initiate a handshake in order to establish a communication session with the image processing device 100. Based on an initial handshake request from the mobile computing device 200, the image processing device 100 may send an acknowledgment. Based on the handshake, a communication session may be established between the mobile computing device 200 and the image processing device 100. In some embodiments, the image processing device 100 uses the network interface 109 when receiving and sending signals.

Prior to the communication session being established, the mobile computing device 200 and the image processing device 100 may already be connected to the same network. For example, the mobile computing device 200 and the image processing device 100 may both be connected to the network 401 of FIG. 4A, or the mobile computing device 200 and the image processing device 100 may both be connected to the network 403 of FIG. 4B. Thus, the communication session established in step S604 may be a communication session over a network to which the mobile computing device 200 and the image processing device 100 were already connected at the time the communication session was established.

In step S605, based on the image processing device 100 detecting that a physical document is in position for scanning, and in response to receiving the communication establishing the communication session in step S604, the image processing device 100 sends to the mobile computing device 200 a communication indicating the image processing device 100 is ready to perform the scanning of the physical document.

As described with respect to FIG. 1A, in some embodiments, the scanner unit 117 includes one or more sensors to detect that a physical document is in position for the scanner unit 117 to execute a scanning operation on the physical document. For example, when the one or more sensors detect that a physical document has been placed on the glass platen or ADF, the one or more sensors send a signal(s) to the processor(s) 101 indicating the presence of the physical document. Based on signals the one or more sensors send to the processor(s) 101, the image processing device 100 may continually monitor whether a physical document is in position for the scanner unit 117 to execute a scanning operation on the physical document.

According to the present embodiment, in a case that a physical document is detected to be in position for scanning when the communication session is established in step S604, the image processing device 100 automatically sends to the mobile computing device 200 a communication indicating the image processing device 100 is ready to perform the scanning of the physical document.

In some embodiments, during the communication session, and in response to the image processing device 100 detecting that a physical document is in position for scanning, the image processing device 100 sends to the mobile computing device 200 a communication indicating the image processing device 100 is ready to perform the scanning of the physical document.

In step S606, the image processing device 100 receives a scan command from the mobile computing device 200 during the communication session between the mobile computing device 200 and the image processing device 100. For example, the image processing device 100 may receive the scan command the mobile computing device 200 sent in step S805. The scan command comprises an instruction to perform an image scanning operation on a physical document placed on the glass platen or in the ADF of the scanner unit 117.

In some embodiments, in addition to the instruction to perform the scanning operation, the scan command may further include information pertaining to the scanning operation. For example, the scan command may include scan settings pertaining to a resolution of the scan, color or black and white settings, contrast settings, file type settings for the electronic document resulting from the scan operation, or other scan settings for the scanning operation. The scan settings included in the scan command may be preset or default settings stored in the mobile computing device 200. In some embodiments, the scan settings included in the scan command may be custom settings set and stored in the mobile computing device 200. Alternatively, the scan command may not include scan settings; rather, the scan settings may be previously stored in the image processing device 100 as preset or default settings. Or, in some embodiments, the scan settings may be custom settings set in the image processing device 100 prior to receiving the scan command.

In some embodiments, the scan command may further include destination information. For example, the scan command may include identification information of the mobile computing device 200 (for example, a device ID of the mobile computing device 200). In some embodiments, the scan command does not include destination information. For example, the image processing device 100 may already have destination information stored (for example, in a cache memory of the image processing device 100) such that destination information does not need to be included in the scan command. By way of example, the identification information of the mobile computing device 200 may be stored with other session information in the image processing device 100 and may be used as the destination information for sending a scan result.

In step S607, the image processing device 100 scans a physical document in response to the scan command received in step S606. The physical document is, for example, a physical document placed on the glass platen or in the ADF of the scanner unit 117. In response to the scan command, the scanner unit 117 performs a scanning operation on the physical document. The image sensor scans the physical document to generate electrical signals which are converted to digital image data representing the scanned physical document. In some embodiments, the digital image data undergoes image processing using one or more of the components of the image processing device 100 described above to processes the digital image data. Digital image data is then sent to the processor(s) 101. In some embodiments, the digital image data is also stored in memory, such as the HDD 104 of the image processing device 100.

The processor(s) 101 then convert the digital image data into an electronic document representing the scanned physical document and the electronic document is ready to be sent to a destination. In converting the digital image data into the electronic document, the processor(s) 101 may perform format conversion processing. For example, the processor(s) 100 may convert the digital image data to an electronic document in a particular file format, such as portable document format (PDF), plain text, or some other file format for sending. In some embodiments, the processor(s) 101 may also execute an image processing technique such as optical character recognition (OCR) on the electronic document.

Instructions for performing file format conversion or for performing various image processing techniques may be stored in the HDD 104 or another storage medium of the image processing device 100 and may be executed by the processor(s) 101. In some embodiments, commands for performing these or other image processing techniques may be in the scan command. For example, the scan command may indicate a format into which the digital image data should be converted for sending the electronic document representing the scanned physical document to a destination.

In some embodiments, an image of the scanned physical document may be displayed on the display 126 of the image processing device 100. The image may be displayed automatically according to a default setting, or the image may be displayed in response to a user input requesting the image be displayed. In some embodiments, the processor(s) 101 cause the display 126 to display a query asking the user whether the user would like the image to be displayed.

In step S608, the image processing device 100 sends the electronic document representing the scanned physical document to the mobile computing device 200 during the communication session. In some embodiments, the image processing device 100 automatically initiates sending the electronic document to the mobile computing device 200 upon completing the processing of step S607. In some embodiments, the image processing device 100 sends the electronic document to the mobile computing device 200 in response to a request from the mobile computing device 200 for the electronic document. For example, upon completing the processing of step S607, the image processing device 100 may store the electronic document and send to the mobile computing device 200 a communication indicating the scanning of the physical document is complete. Based on the communication indicating the scanning of the physical document is complete, the mobile computing device 200 may send to the image processing device 100 the request for the electronic document. In response to the request, the image processing device 100 retrieves the electronic document (for example, from the HDD 104) and sends the electronic document to the mobile computing device 200, according to embodiments of the invention.

In some embodiments, the image processing device 100 sends the electronic document to the mobile computing device 200 over the communication channel used for the communication session. For example, in some embodiments, the communication session is over the network 401 of FIG. 4A and the image processing device 100 sends the electronic document to the mobile computing device 200 over the network 401 and the WAP 402. In some embodiments, the communication session is over the network 403 of FIG. 4B and the image processing device 100 sends the electronic document to the mobile computing device 200 over the network 403, the Internet 405 and the cellular network 404. Alternatively, in some embodiments, the image processing device 100 sends the electronic document to the mobile computing device 200 over a different communication channel than the one used for the communication session.

In some embodiments, in addition to sending the electronic document to the mobile computing device 200, the image processing device 100 also displays on the display 126 a confirmation that the electronic document has been sent to the mobile computing device 200. In some embodiments, in addition to sending the electronic document to the mobile computing device 200, the image processing device 100 also sends to a destination a notification that the electronic document has been sent to the mobile computing device 200.

FIG. 7 illustrates an example method for obtaining an electronic document. In step S701, the mobile computing device 200 reads a machine-readable code associated with the image processing device 100. For example, the mobile computing device 200 may read the machine-readable code output by the image processing device 100 in step S503. In some embodiments, the machine-readable code is read by the mobile computing device 200 while the machine-readable code is displayed on the display 126 of the image processing device 100.

In some embodiments, the mobile computing device 200 reads the machine-readable code in response to a user input. For example, the mobile computing device 200 may perform a reading operation in response to the user pressing a hard button on the mobile computing device 200 or a graphical object displayed on a GUI of the mobile computing device 200.

In some embodiments, the mobile computing device 200 reads the machine-readable code with a reading unit. The reading unit may be a reading unit such as the reading unit 301 described above with respect to FIG. 3A. The reading unit may include, for example, a camera for acquiring an image and may additionally include image processing circuitry for processing an acquired image. The reading unit uses an image sensor to detect an image and generate electrical signals. Electrical signals are converted to digital image data representing the machine-readable code. The digital image data may then undergo image processing. In some embodiments, the digital image data is also stored in the memory 202 and/or the storage 203 of the mobile computing device 200.

In step S702, the mobile computing device 200 obtains information encoded in the machine-readable code by decoding the machine-readable code read in step S701. Instructions for decoding the machine-readable code may be stored in the memory 202 and/or the storage 203 of the mobile computing device 200 and may be executed by the processor(s) 201.

The information obtained by decoding the machine-readable code may vary. In some embodiments, identification information that identifies the image processing device 100 is obtained from the machine-readable code. In some cases, the mobile computing device 200 may be able to connect to the same network as the image processing device 100, but may not have identifying information (such as IP address) of the image processing device 100. For example, FIG. 4A may represent a public network environment, in which the image processing device 100 is available at a hotel, library, or business establishment (for example, a restaurant or coffee shop). The user of the mobile computing device 200 may be able to access the network 401 via a WI-FI WAP 402 provided by the hotel, library or business establishment, but may not know identifying information of the image processing device 100. Or the identifying information may be available but it may be difficult to locate or inconvenient to input into the mobile computing device 200. By reading and decoding the machine-readable code to obtain the identification information, the mobile computing device 200 may easily identify the network 401 resource, namely, the image processing device 100.

Further by way of example, FIG. 4B may represent a VPN as described above. Many network resources may exist on the network 403 and the mobile computing device 200 may not be configured for some network resources, such as the image processing device 100. Thus, by reading and decoding the machine-readable code to obtain the identification information, the mobile computing device 200 may easily identify the network 403 resource, namely, the image processing device 100.

In some embodiments, other configuration information usable by the mobile computing device 200 for establishing the communication session may be encoded in the machine-readable code, such as other information relating to the image processing device 100, or routing information.

In step S703, in response to obtaining the information in step S702, the mobile computing device 200 establishes a communication session between the mobile computing device 200 and the image processing device 100 using the information. Instructions for establishing the communication session may be stored in the memory 202 and/or the storage 203 of the mobile computing device 200 and may be executed by the processor(s) 201.

In some embodiments, the mobile computing device 200 may initiate a handshake in order to establish the communication session with the image processing device 100. Based on an initial handshake request from the mobile computing device 200, the image processing device 100 may send an acknowledgment. Based on the handshake, a communication session may be established between the mobile computing device 200 and the image processing device 100. In some embodiments, the mobile computing device 200 uses the communication interface 205 when sending and receiving signals.

Prior to the communication session being established, the mobile computing device 200 and the image processing device 100 may already be connected to the same network. For example, the mobile computing device 200 and the image processing device 100 may both be connected to the network 401 of FIG. 4A, or the mobile computing device 200 and the image processing device 100 may both be connected to the network 403 of FIG. 4B. Thus, the communication session established in step S703 may be a communication session over a network to which the mobile computing device 200 and the image processing device 100 were already connected at the time the communication session was established.

In step S704, during the communication session established in step S703, the mobile computing device 200 receives from the image processing device 100 an electronic document representing a physical document the image processing device 100 scanned during the communication session. For example, the mobile computing device 200 may receive the electronic document generated in step S506 and sent in step S507 by the image processing device 100.

In some embodiments, the mobile computing device 200 receives the electronic document without sending a request for the electronic document. The mobile computing device 200 may receive the electronic document by virtue of the communication session established in step S703, for example. In some embodiments, the mobile computing device 200 receives the electronic document in response to a request from the mobile computing device 200 to the image processing device 100 for the electronic document. For example, during the communication session, the mobile computing device 200 may receive from the image processing device 100 a communication indicating the scanning of the physical document is complete. Based on the communication indicating the scanning of the physical document is complete, the mobile computing device 200 sends to the image processing device 100 the request for the electronic document. The mobile computing device 200 then receives the electronic document from the image processing device 100 in response to the request, according to embodiments of the invention.

In some embodiments, the mobile computing device 200 receives the electronic document from the image processing device 100 over the communication channel used for the communication session. For example, in some embodiments, the communication session is over the network 401 of FIG. 4A and the mobile computing device 200 receives the electronic document from the image processing device 100 over the network 401 and the WAP 402. In some embodiments, the communication session is over the network 403 of FIG. 4B and the mobile computing device 200 receives the electronic document from the image processing device 100 over the network 403, the Internet 405 and the cellular network 404. Alternatively, in some embodiments, the mobile computing device 200 receives the electronic document from the image processing device 100 over a different communication channel than the one used for the communication session.

In some embodiments, once the mobile computing device 200 receives the electronic document, an image of the electronic document may be displayed on a display of the mobile computing device 200. For example, an image of the electronic document may be displayed on a display such as the display 302 of the mobile computing device 300. The image may be displayed automatically according to a default setting, or the image may be displayed in response to a user input requesting the image be displayed. In some embodiments, the processor(s) 201 cause a display of the mobile computing device 200 to display a query asking the user whether the user would like the image to be displayed.

FIG. 8 illustrates an example method for obtaining an electronic document. In step S801, the mobile computing device 200 reads a machine-readable code associated with the image processing device 100. For example, the mobile computing device 200 may read the machine-readable code output by the image processing device 100 in step S603. In some embodiments, the machine-readable code is read by the mobile computing device 200 while the machine-readable code is displayed on the display 126 of the image processing device 100.

In some embodiments, the mobile computing device 200 reads the machine-readable code in response to a user input. For example, the mobile computing device 200 may perform a reading operation in response to the user pressing a hard button on the mobile computing device 200 or a graphical object displayed on a GUI of the mobile computing device 200.

In some embodiments, the mobile computing device 200 reads the machine-readable code with a reading unit. The reading unit may be a reading unit such as the reading unit 301 described above with respect to FIG. 3A. The reading unit may include, for example, a camera for acquiring an image and may additionally include image processing circuitry for processing an acquired image. The reading unit uses an image sensor to detect an image and generate electrical signals. Electrical signals are converted to digital image data representing the machine-readable code. The digital image data may then undergo image processing. In some embodiments, the digital image data is also stored in the memory 202 and/or the storage 203 of the mobile computing device 200.

In step S802, the mobile computing device 200 obtains information encoded in the machine-readable code by decoding the machine-readable code read in step S801. Instructions for decoding the machine-readable code may be stored in the memory 202 and/or the storage 203 of the mobile computing device 200 and may be executed by the processor(s) 201.

The information obtained by decoding the machine-readable code may vary. In some embodiments, identification information that identifies the image processing device 100 is obtained from the machine-readable code. In some cases, the mobile computing device 200 may be able to connect to the same network as the image processing device 100, but may not have identifying information (such as IP address) of the image processing device 100. For example, FIG. 4A may represent a public network environment, in which the image processing device 100 is available at a hotel, library, or business establishment (for example, a restaurant or coffee shop). The user of the mobile computing device 200 may be able to access the network 401 via a WI-FI WAP 402 provided by the hotel, library or business establishment, but may not know identifying information of the image processing device 100. Or the identifying information may be available but it may be difficult to locate or inconvenient to input into the mobile computing device 200. By reading and decoding the machine-readable code to obtain the identification information, the mobile computing device 200 may easily identify the network 401 resource, namely, the image processing device 100.

Further by way of example, FIG. 4B may represent a VPN as described above. Many network resources may exist on the network 403 and the mobile computing device 200 may not be configured for some network resources, such as the image processing device 100. Thus, by reading and decoding the machine-readable code to obtain the identification information, the mobile computing device 200 may easily identify the network 403 resource, namely, the image processing device 100.

In some embodiments, other configuration information usable by the mobile computing device 200 for establishing the communication session may be encoded in the machine-readable code, such as other information relating to the image processing device 100, or routing information.

In step S803, in response to obtaining the information in step S802, the mobile computing device 200 establishes a communication session between the mobile computing device 200 and the image processing device 100 using the information. Instructions for establishing the communication session may be stored in the memory 202 and/or the storage 203 of the mobile computing device 200 and may be executed by the processor(s) 201.

In some embodiments, the mobile computing device 200 may initiate a handshake in order to establish the communication session with the image processing device 100. Based on an initial handshake request from the mobile computing device 200, the image processing device 100 may send an acknowledgment. Based on the handshake, a communication session may be established between the mobile computing device 200 and the image processing device 100. In some embodiments, the mobile computing device 200 uses the communication interface 205 when sending and receiving signals.

Prior to the communication session being established, the mobile computing device 200 and the image processing device 100 may already be connected to the same network. For example, the mobile computing device 200 and the image processing device 100 may both be connected to the network 401 of FIG. 4A, or the mobile computing device 200 and the image processing device 100 may both be connected to the network 403 of FIG. 4B. Thus, the communication session established in step S803 may be a communication session over a network to which the mobile computing device 200 and the image processing device 100 were already connected at the time the communication session was established.

In step S804, during the communication session established in step S803, the mobile computing device 200 receives from the image processing device 100 a communication indicating the image processing device 100 is ready to perform scanning of a physical document. For example, the mobile computing device 200 may receive the communication the image processing device 100 sent in step S605.

In step S805, the mobile computing device 200 sends a scan command to the image processing device 100 during the communication session.

In some embodiments, the mobile computing device 200 sends the scan command in response to receiving in step S804 the communication indicating the image processing device 100 is ready to perform the scanning of the physical document. Accordingly, the scan command is sent automatically without requiring the user to provide a user input operation via a user interface of the mobile computing device 200 to send the scan command.

In some embodiments, in response to receiving in step S804 the communication indicating the image processing device 100 is ready to perform the scanning of the physical document, the mobile computing device 200 prompts a user to provide a user input operation via a user interface of the mobile computing device. For example, the mobile computing device 200 may prompt the user by displaying a graphical object on a display of the mobile computing device 200. The display may be a display such as the display 302 of the mobile computing device 300. The display may be touch sensitive such that the user input operation may be provided by the user touching the displayed graphical object. Alternatively or additionally, the mobile computing device 200 may prompt the user to provide the user input operation by pressing a hard key of the mobile computing device 200. Other user input operations and/or I/O devices than the above examples could also be utilized.

The user may provide the user input operation(s) and the mobile computing device 200 receives the user input operation(s) via the user interface of the mobile computing device 200. In response to the receiving the user input operation(s), the mobile computing device 200 sends the scan command to the image processing device 100.

The scan command comprises an instruction to perform an image scanning operation on a physical document placed on the glass platen or in the ADF of the scanner unit 117 of the image processing device 100 in order to generate an electronic document representing the scanned physical document.

In some embodiments, in addition to the instruction to perform the scanning operation, the scan command may further include information pertaining to the scanning operation. For example, the scan command may include scan settings pertaining to a resolution of the scan, color or black and white settings, contrast settings, file type settings for the electronic document resulting from the scan operation, or other scan settings for the scanning operation. The scan settings included in the scan command may be preset or default settings stored in the mobile computing device 200. In some embodiments, the scan settings included in the scan command may be custom settings set and stored in the mobile computing device 200. These custom settings may be set by user input operation(s) via the user interface of the mobile computing device 200. Alternatively, the scan command may not include scan settings; rather, the scan settings may be previously stored in the image processing device 100 as preset or default settings. Or, in some embodiments, the scan settings may be custom settings set in the image processing device 100 prior to receiving the scan command.

In some embodiments, the scan command may further include destination information. For example, the scan command may include identification information of the mobile computing device 200 (for example, a device ID of the mobile computing device 200). In some embodiments, the scan command does not include destination information. For example, the image processing device 100 may already have destination information stored (for example, in a cache memory of the image processing device 100) such that destination information does not need to be included in the scan command. By way of example, the identification information of the mobile computing device 200 may be stored with other session information in the image processing device 100 and may be used as the destination information for sending a scan result.

In some embodiments, the scan command may indicate a format into which the digital image data should be converted for sending the electronic document representing the scanned physical document to a destination. For example, the scan command may indicate that the digital image data should be converted to an electronic document in a particular file format, such as portable document format (PDF), plain text, or some other file format for sending. In some embodiments, the scan command may further include a command to perform other image processing techniques, such as OCR, on the electronic document.

In step S806, during the communication session established in step S803, the mobile computing device 200 receives from the image processing device 100 an electronic document representing a physical document the image processing device 100 scanned in response to the scan command the mobile computing device 200 sent in step S805. For example, the mobile computing device 200 may receive the electronic document generated in step S607 and sent in step S608 by the image processing device 100.

In some embodiments, the mobile computing device 200 receives the electronic document without sending a request for the electronic document. The mobile computing device 200 may receive the electronic document by virtue of the communication session established in step S803, for example. In some embodiments, the mobile computing device 200 receives the electronic document in response to a request from the mobile computing device 200 to the image processing device 100 for the electronic document. For example, during the communication session, the mobile computing device 200 may receive from the image processing device 100 a communication indicating the scanning of the physical document is complete. Based on the communication indicating the scanning of the physical document is complete, the mobile computing device 200 sends to the image processing device 100 the request for the electronic document. The mobile computing device 200 then receives the electronic document from the image processing device 100 in response to the request, according to embodiments of the invention.

In some embodiments, the mobile computing device 200 receives the electronic document from the image processing device 100 over the communication channel used for the communication session. For example, in some embodiments, the communication session is over the network 401 of FIG. 4A and the mobile computing device 200 receives the electronic document from the image processing device 100 over the network 401 and the WAP 402. In some embodiments, the communication session is over the network 403 of FIG. 4B and the mobile computing device 200 receives the electronic document from the image processing device 100 over the network 403, the Internet 405 and the cellular network 404. Alternatively, in some embodiments, the mobile computing device 200 receives the electronic document from the image processing device 100 over a different communication channel than the one used for the communication session.

In some embodiments, once the mobile computing device 200 receives the electronic document, an image of the electronic document may be displayed on a display of the mobile computing device 200. For example, an image of the electronic document may be displayed on a display such as the display 302 of the mobile computing device 300. The image may be displayed automatically according to a default setting, or the image may be displayed in response to a user input requesting the image be displayed. In some embodiments, the processor(s) 201 cause a display of the mobile computing device 200 to display a query asking the user whether the user would like the image to be displayed.

In some embodiments, various steps described above are performed over a period of time without requiring a user input operation for the duration of the period. For example, referring to FIG. 6, in some embodiments, the image processing device 100 receives from the mobile computing device 200 a communication establishing the communication session (step S604), receives a scan command from the mobile computing device 200 (step S606), scans a physical document in response to the scan command (step S607), and sends an electronic document representing the scanned physical document to the mobile computing device 200 during the communication session (step S608), all over a period of time without requiring a user input operation for the duration of the period. Further by way of example, referring to FIG. 8, in some embodiments, the mobile computing device 200 establishes the communication session with the image processing device 100 (step S803), sends the scan command to the image processing device 100 (step S805), and receives from the image processing device 100 an electronic document representing a physical document the image processing device 100 scanned in response to the scan command (step S806), all over a period of time without requiring a user input operation for the duration of the period.

By way of example, a user of a mobile computing device 200 may approach an image processing device 100 and position a physical document on the image processing device 100 for the image processing device 100 to perform a scanning operation on the physical document. Based on receiving an indication that a predetermined event, such as described above with respect to step S601, has occurred, the image processing device 100 generates and outputs a machine-readable code (steps S602 and S603). Accordingly, a physical document is in position for the image processing device 100 to perform a scanning operation, and a computer-readable code is displayed on the display 126 of the image processing device 100. In the above-described scenario, according to some embodiments, a user may provide one additional user input operation at the mobile computing device 200 to cause the reading and the obtaining information by decoding the machine-readable code to occur (steps S801 and S802); and then the remaining steps described above with respect to FIGS. 6 and 8 may be performed over a period of time without requiring any further user input operation for the duration of the period. That is, in some embodiments, once the mobile computing device 200 reads and obtains information by decoding the machine-readable code, various steps described above are then automatically performed without further user input operation.

Once the mobile computing device 200 reads and decodes the machine-readable code, the mobile computing device 200 may automatically use the information obtained from the machine-readable code to establish a communication session between the mobile computing device 200 and the image processing device 100 (steps S803, S604). Once the communication session is established, and since a physical document is detected to be in position for the image processing device 100 to perform a scanning operation, the image processing device 100 automatically sends to the mobile computing device 200 a communication indicating the image processing device 100 is ready to perform the scanning of the physical document (steps S605, S804). In some embodiments, the mobile computing device 200 automatically sends a scan command to the image processing device 100 in response to the communication (steps S805, S606). In response to the scan command, the image processing device 100 may perform a scanning operation on the physical document positioned on the glass platen or ADF of the image processing device 100 (step S607). In some embodiments, once the image processing device 100 generates an electronic document representing the scanned physical document, the image processing device 100 automatically sends the electronic document to the mobile computing device 200 (step S608, step S806).

From the user's perspective, once the user initiates an image reading operation to read the machine-readable code with the reading unit of the mobile computing device 200 (for example, a user may scan a two-dimensional bar code with a camera of the mobile computing device 300), the mobile computing device 200 automatically connects to the image processing device 100, and the image processing device 100 executes a scan operation and sends a scan result, namely an electronic document representing the scanned physical document, to the mobile computing device 200, all without requiring a further user input operation.

In some embodiments, the image processing device 100 may communicate information usable by the mobile computing device 200 to establish a communication session between the mobile computing device 200 and the image processing device 100 by way of near-field communication. For example, instead of outputting a machine-readable code, having identification information of the image processing device 100 encoded in the machine-readable code, the image processing device 100 may output the identification information from an NFC transceiver (for example, an NFC reader) connected to or included in the image processing device 100. Moreover, the mobile computing device 200 may be an NFC-enabled mobile computing device having an NFC transceiver, such as the NFC device 306 located within the enclosure of the mobile computing device 300, operable to receive the identification information output from the NFC transceiver of the image processing device 100.

Once the mobile computing device 200 obtains the information by near-field communication, the mobile computing device 200 may continue to perform steps S703 to S704 and/or steps S803 to S806 described above. Moreover, once the image processing device 100 outputs the information by near-field communication, the image processing device 100 may continue to perform steps S504 to S507 and/or steps S604 to S608 described above.

Various above-described operations performed by the image processing device 100 may be executed and/or controlled by one or more applications running on the image processing device 100. Additionally, various above-described operations performed by the mobile computing device 200 may be executed and/or controlled by one or more applications running on the mobile computing device 200.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, cause the one or more processors to perform one or more embodiments of the invention described herein. The scope of the present invention includes a computer-readable storage medium storing instructions which, when executed by one or more processors, cause the image processing device 100 to perform one or more embodiments of the invention described herein. The scope of the present invention includes a computer-readable storage medium storing instructions which, when executed by one or more processors, cause the mobile computing device 200 to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method comprising:
   displaying on a display of an image processing device a machine-readable code, wherein information encoded in the machine-readable code is usable by a mobile computing device to establish a communication session between the mobile computing device and the image processing device;
   receiving, at the image processing device from the mobile computing device, a communication establishing the communication session;
   in response to the receiving the communication establishing the communication session, sending, from the image processing device to the mobile computing device, a communication indicating the image processing device is ready to perform scanning of a physical document;
   receiving, at the image processing device from the mobile computing device, a scan command during the communication session;
   scanning, at the image processing device, the physical document in response to the scan command; and
   sending, from the image processing device to the mobile computing device, an electronic document representing the scanned physical document during the communication session,
   wherein the receiving the communication establishing the communication session, the sending the communication indicating the image processing device is ready to perform scanning of the physical document, the receiving the scan command, the scanning the physical document, and the sending the electronic document are performed over a period of time without requiring any user input operation for the entirety of the duration of the period from the receiving the communication establishing the communication session to the sending the electronic document.

2. The method of claim 1, wherein the information comprises identification information that identifies the image processing device.

3. The method of claim 1, wherein the communication session is over a local area network.

4. The method of claim 1, wherein the communication session is over a wide area network.

5. The method of claim 1, further comprising:
   detecting, at the image processing device using a sensor, that the physical document is in position for the image processing device to perform the scanning of the physical document, wherein the displaying the machine-readable code comprises automatically displaying the machine-readable code in response to the detecting that the physical document is in position for the image processing device to perform the scanning of the physical document.

6. The method of claim 1, further comprising:
detecting, at the image processing device using a sensor, that the physical document is in position for the image processing device to perform the scanning of the physical document,
wherein the sending the communication indicating the image processing device is ready to perform scanning of the physical document is based on the detecting that the physical document is in position for the image processing device to perform the scanning of the physical document.

7. A non-transitory computer-readable storage medium storing instructions which, when executed by one or more processors, cause an image processing device to perform operations comprising:
displaying on a display of the image processing device a machine-readable code, wherein information encoded in the machine-readable code is usable by a mobile computing device to establish a communication session between the mobile computing device and the image processing device;
receiving, at the image processing device from the mobile computing device, a communication establishing the communication session;
in response to the receiving the communication establishing the communication session, sending, from the image processing device to the mobile computing device, a communication indicating the image processing device is ready to perform scanning of a physical document;
receiving, at the image processing device from the mobile computing device, a scan command during the communication session;
scanning, at the image processing device, the physical document in response to the scan command; and
sending, from the image processing device to the mobile computing device, an electronic document representing the scanned physical document during the communication session,
wherein the receiving the communication establishing the communication session, the sending the communication indicating the image processing device is ready to perform scanning of the physical document, the receiving the scan command, the scanning the physical document, and the sending the electronic document are performed over a period of time without requiring any user input operation for the entirety of the duration of the period from the receiving the communication establishing the communication session to the sending the electronic document.

8. A method comprising:
reading, at a mobile computing device, a machine-readable code associated with an image processing device;
obtaining, at the mobile computing device, information encoded in the machine-readable code by decoding the machine-readable code;
in response to the obtaining the information, establishing a communication session between the mobile computing device and the image processing device using the information;
during the communication session, receiving, at the mobile computing device from the image processing device, a communication indicating the image processing device is ready to perform scanning of a physical document;
in response to the receiving the communication indicating the image processing device is ready to perform scanning of the physical document, sending, from the mobile computing device to the image processing device, a scan command; and
during the communication session, receiving, at the mobile computing device from the image processing device, an electronic document representing the physical document the image processing device scanned in response to the scan command,
wherein the establishing the communication session, the receiving the communication indicating the image processing device is ready to perform scanning of the physical document, the sending the scan command, and the receiving the electronic document are performed over a period of time without requiring any user input operation for the entirety of the duration of the period from the establishing the communication session to the receiving the electronic document.

9. The method of claim 8, wherein the information comprises identification information that identifies the image processing device.

10. The method of claim 8, wherein the communication session is over a local area network.

11. The method of claim 8, wherein the communication session is over a wide area network.

12. A non-transitory computer-readable storage medium storing instructions which, when executed by one or more processors, cause a mobile computing device to perform operations comprising:
reading, at the mobile computing device, a machine-readable code associated with an image processing device;
obtaining, at the mobile computing device, information encoded in the machine-readable code by decoding the machine-readable code;
in response to the obtaining the information, establishing a communication session between the mobile computing device and the image processing device using the information;
during the communication session, receiving, at the mobile computing device from the image processing device, a communication indicating the image processing device is ready to perform scanning of a physical document;
in response to the receiving the communication indicating the image processing device is ready to perform scanning of the physical document, sending, from the mobile computing device to the image processing device, a scan command; and
during the communication session, receiving, at the mobile computing device from the image processing device, an electronic document representing the physical document the image processing device scanned in response to the scan command,
wherein the establishing the communication session, the receiving the communication indicating the image processing device is ready to perform scanning of the physical document, the sending the scan command, and the receiving the electronic document are performed over a period of time without requiring any user input operation for the entirety of the duration of the period from the establishing the communication session to the receiving the electronic document.

13. An image processing device comprising:
a display;
one or more communication interfaces;
a scanner unit;
one or more memory devices storing instructions for execution by one or more processors; and
the one or more processors, operable when executing the instructions to perform operations comprising:
causing the display to display a machine-readable code, wherein information encoded in the machine-readable code is usable by a mobile computing device to establish a communication session between the mobile computing device and the image processing device;
receiving, at the image processing device from the mobile computing device, a communication establishing the communication session;
in response to the receiving the communication establishing the communication session, sending, from the image processing device to the mobile computing device, a communication indicating the image processing device is ready to perform scanning of a physical document;
receiving, at the image processing device from the mobile computing device, a scan command during the communication session;
causing the scanner unit to scan the physical document in response to the scan command; and
sending, from the image processing device to the mobile computing device, an electronic document representing the scanned physical document during the communication session,
wherein the receiving the communication establishing the communication session, the sending the communication indicating the image processing device is ready to perform scanning of the physical document, the receiving the scan command, the causing the scanner unit to scan the physical document, and the sending the electronic document are performed over a period of time without requiring any user input operation for the entirety of the duration of the period from the receiving the communication establishing the communication session to the sending the electronic document.

14. A mobile computing device comprising:
a reading unit;
one or more communication interfaces;
one or more memory devices storing instructions for execution by one or more processors; and
the one or more processors, operable when executing the instructions to perform operations comprising:
causing the reading unit to read a machine-readable code associated with an image processing device;
obtaining, at the mobile computing device, information encoded in the machine-readable code by decoding the machine-readable code;
in response to the obtaining the information, establishing a communication session between the mobile computing device and the image processing device using the information;
during the communication session, receiving, at the mobile computing device from the image processing device, a communication indicating the image processing device is ready to perform scanning of a physical document;
in response to the receiving the communication indicating the image processing device is ready to perform scanning of the physical document, sending, from the mobile computing device to the image processing device, a scan command; and
during the communication session, receiving, at the mobile computing device from the image processing device, an electronic document representing the physical document the image processing device scanned in response to the scan command,
wherein the establishing the communication session, the receiving the communication indicating the image processing device is ready to perform scanning of the physical document, the sending the scan command, and the receiving the electronic document are performed over a period of time without requiring any user input operation for the entirety of the duration of the period from the establishing the communication session to the receiving the electronic document.

15. The method of claim 1, wherein the scan command comprises a scan command the mobile computing device sent in response to receiving the communication indicating the image processing device is ready to perform scanning of the physical document.

16. The method of claim 8, wherein the communication indicating the image processing device is ready to perform scanning of the physical document comprises a communication the image processing device sent based on detecting, at the image processing device using a sensor, that the physical document is in position for the image processing device to perform the scanning of the physical document.

17. The image processing device of claim 13, wherein the scanner unit includes a sensor, and
wherein the causing the display to display the machine-readable code comprises automatically causing the display to display the machine-readable code in response to detecting, at the image processing device using the sensor, that the physical document is in position for the scanner unit to scan the physical document.

18. The image processing device of claim 13, wherein the scanner unit includes a sensor, and
wherein the sending the communication indicating the image processing device is ready to perform scanning of the physical document is based on detecting, at the image processing device using the sensor, that the physical document is in position for the scanner unit to scan the physical document.

19. The image processing device of claim 13, wherein the scan command comprises a scan command the mobile computing device sent in response to receiving the communication indicating the image processing device is ready to perform scanning of the physical document.

20. The mobile computing device of claim 14, wherein the communication indicating the image processing device is ready to perform scanning of the physical document comprises a communication the image processing device sent based on detecting, at the image processing device using a sensor, that the physical document is in position for the image processing device to perform the scanning of the physical document.

21. The non-transitory computer-readable storage medium of claim 7, wherein the scan command comprises a scan command the mobile computing device sent in response to receiving the communication indicating the image processing device is ready to perform scanning of the physical document.

* * * * *